United States Patent
Khatua et al.

(10) Patent No.: US 8,562,871 B2
(45) Date of Patent: Oct. 22, 2013

(54) COMPOSITION AND ASSOCIATED METHOD

(75) Inventors: Bhanu Bhusan Khatua, Bangalore (IN); Sumanda Bandyopadhyay, Bangalore (IN); Soumyadeb Ghosh, Bangalore (IN); Hari Nadathur Seshadri, Bangalore (IN); Franciscus Petrus Maria Mercx, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 1147 days.

(21) Appl. No.: 11/563,736

(22) Filed: Nov. 28, 2006

(65) Prior Publication Data

US 2008/0009572 A1 Jan. 10, 2008

Related U.S. Application Data

(63) Continuation-in-part of application No. 11/483,480, filed on Jul. 10, 2006.

(51) Int. Cl.
*H01B 1/20* (2006.01)
*H01C 7/02* (2006.01)
*C08K 3/20* (2006.01)

(52) U.S. Cl.
USPC ........ 252/511; 252/500; 252/502; 252/520.2; 252/62.3 R; 338/20; 338/21; 338/22 R; 219/209

(58) Field of Classification Search
USPC .............. 252/500, 511, 520.2, 519.12, 518.1; 219/505, 528; 264/616, 202.18; 29/610.1, 621; 423/263, 598, 608; 524/413, 47; 501/134–139; 338/22 R, 338/22 SD; 361/103
See application file for complete search history.

(56) References Cited

U.S. PATENT DOCUMENTS

| | | | |
|---|---|---|---|
| 4,470,898 A | * | 9/1984 | Penneck et al. ................ 252/511 |
| 4,483,933 A | * | 11/1984 | Kobayashi et al. ........... 501/138 |
| 4,545,926 A | * | 10/1985 | Fouts et al. ................... 252/511 |
| 4,560,498 A | | 12/1985 | Horsma et al. |
| 4,880,577 A | * | 11/1989 | Okita et al. ................... 252/511 |
| 5,106,538 A | * | 4/1992 | Barma et al. ................. 252/511 |
| 5,219,811 A | * | 6/1993 | Enomoto et al. ............. 501/138 |
| 5,629,658 A | | 5/1997 | Chen |
| 2003/0031438 A1 | | 2/2003 | Kambe et al. |
| 2003/0059366 A1 | | 3/2003 | Venigalla et al. |
| 2003/0218530 A1 | * | 11/2003 | Yoshinari et al. ........... 338/22 R |
| 2004/0009351 A1 | | 1/2004 | Venigalla et al. |
| 2004/0151892 A1 | | 8/2004 | Holl et al. |

FOREIGN PATENT DOCUMENTS

| | | | |
|---|---|---|---|
| JP | 59-122524 | * | 7/1984 |
| JP | 59122524 | * | 7/1984 |
| WO | WO0238669 | | 5/2002 |
| WO | 2005048273 A2 | | 5/2005 |

OTHER PUBLICATIONS

BaTiO3 properties,2004, p. 1, http:// www.azom.com/details.asp?ArticleID=2280.*
Ketjenblack, 2004, p. 1 http://www.infochems.com/market/general_content.asp?idx=19&ctype=sell&Itype=list&list=all&inx=K& search_option=n&search_keyword=n&Iorder=regi_date& page=1.*
H-M Park, et al. "Exfoliated Graphite Nanoplatelet (xGnP)/Polypropylene Nanocomposites" www.speautomotive.com/.../nanocomposites_part2_paper2_park_msu.pdf.
L.Rejon, et al. "Percolation Phenomena in Carbon Black-Filled Polymeric Concrete" (Sep. 2000); httpL// findarticles.com/p/articles/mi_hb3367/is_9_40/ai_n28797387/(9 pages).

* cited by examiner

*Primary Examiner* — Stanley Silverman
*Assistant Examiner* — Kallambella Vijayakumar
(74) *Attorney, Agent, or Firm* — Cantor Colburn LLP

(57) ABSTRACT

A composition includes a filler dispersed in a polymeric matrix. The filler may be electrically conducting in a temperature range and may have a Curie temperature. The composition may have a trip temperature at which electrical resistance of the composition increases with increase in temperature, and the trip temperature of the composition may be determined by the Curie temperature of the filler. The filler may be present in the polymeric matrix in an amount determined by a property of one or both of the polymeric matrix or the filler. An associated method is provided.

29 Claims, 6 Drawing Sheets

COMPOSITION AND ASSOCIATED METHOD

CROSS REFERENCE TO RELATED APPLICATIONS

This application is a continuation-in-part of application Ser. No. 11/483,480, entitled "Composition and Associated Method", filed Jul. 10, 2006. This application claims priority to and benefit from the foregoing, the disclosures of which are incorporated herein by reference.

BACKGROUND

1. Technical Field

The invention includes embodiments that may relate to an electrically conducting composition. The invention includes embodiments that may relate to a method of making the electrically conducting composition.

2. Discussion of Related Art

Electrically conductive compositions may be used for a variety of applications. Conductive compositions capable of becoming electrically resistive because of a change in temperature may be used in, for example, electronic devices, over-current protection devices, or electrical heaters.

At low temperatures, the resistance of the electrically conducting composition may be low and may allow a large amount of electrical current to flow through the composition. As the temperature is increased up to a point, there may be a large increase in the electrical resistivity of the composition. A function/curve of the electrical resistivity with temperature may have a positive slope and within this temperature range the electrically conducting composition may have a positive temperature coefficient of resistance (PTCR). As the temperature is raised further, the electrical resistivity of the composition may decrease with temperature and the electrically conducting composition may display a negative temperature coefficient of resistance (NTCR).

PTCR compositions may include an electrically conductive filler, such as carbon black, dispersed in an olefin-based crystalline polymeric matrix or hard metal fillers dispersed in a semi-crystalline or amorphous polymeric matrix. In some PTCR compositions, the PTCR effect may be related to a melting temperature of the polymeric matrix. In other PTCR compositions, a mismatch between the coefficient of thermal expansion between the polymer and the filler may result in a localized disruption in the electrically conductive network, resulting in the PTCR effect. Factors such as the polymer properties and thermal history may effect the electrical properties of the composition. Because at least the thermal history may change, the properties may not be reproducible. Alternative PTCR materials may include polycrystalline ceramic materials that may be made semi-conductive by addition of dopants. Ceramic-based materials may have to be sintered to form electrical articles and may not be processed into articles having a desired shape, mechanical property, or both the desired shape and mechanical property.

It may be desirable to have conductive compositions with electrical and processing properties that differ from those properties of currently available compositions. It may be desirable to have an electrically conductive composition produced by a method that differs from those methods currently available.

BRIEF DESCRIPTION

In one embodiment, a composition is provided. The composition includes a filler dispersed in a polymeric matrix. The filler is electrically conducting in a temperature range and the filler has a Curie temperature. The composition has a trip temperature at which electrical resistance of the composition increases with increase in temperature, and the trip temperature of the composition is determined by the Curie temperature of the filler. The filler is present in the polymeric matrix in an amount determined by a property of one or both of the polymeric matrix or the filler.

In one embodiment, a method is provided. The method includes dispersing a filler in a polymeric matrix to form a composition. The filler is electrically conducting and has a Curie temperature. The composition has a trip temperature, and an electrical resistance of the composition increases with an increase in temperature, at least until a temperature that is greater than the trip temperature. The method includes tuning the trip temperature of the composition by selecting the filler based on one or both of the filler's Curie temperature or the amount of the filler present.

In one embodiment, a composition is provided. The composition includes a polymeric matrix. Dispersed within the polymer matrix is a means for tuning a positive temperature coefficient trip temperature of the composition. The tuning means is independent of characteristics or properties of or associated with the polymeric matrix.

BRIEF DESCRIPTION OF DRAWING FIGURES

DETAILED DESCRIPTION

Figure 1:
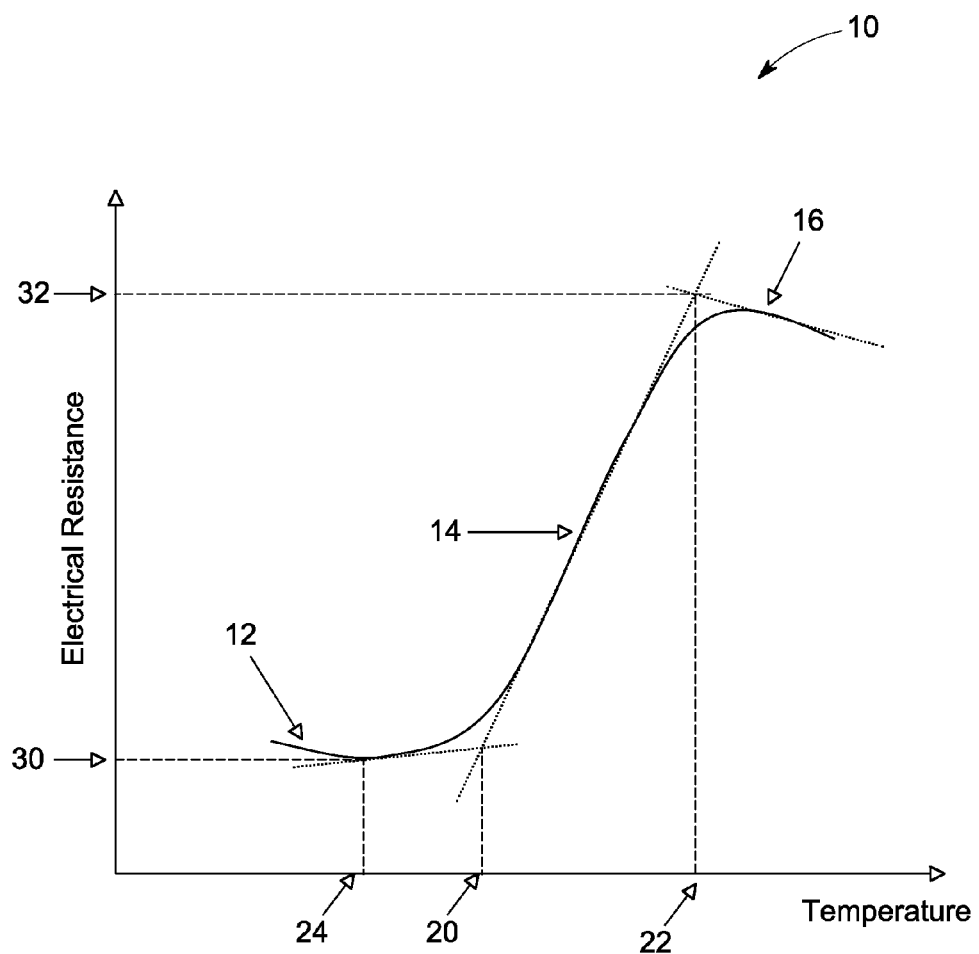
FIG. 1 is a plot of electrical resistance of a filler as a function of increase in temperature.

The invention includes embodiments that relate to an electrically conducting composition. The invention includes embodiments that relate to a method of making the electrically conducting composition.

In the following specification and the claims which follow, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity can not occur—this distinction is captured by the terms "may" and "may be".

The invention provides a composition in one embodiment. The composition includes a filler dispersed in a polymeric matrix. The filler may be electrically conducting in a temperature range ($T_1$). Electrical conductivity may be a measure of a material's ability to conduct an electric current when an electrical potential difference is applied across it. As used herein, filler is electrically conducting unless language or context indicates otherwise. As used herein, electrically conductive fillers may refer to highly-conductive fillers or semiconductive fillers. In certain embodiments, the filler may be electrically conducting in its natural form. In alternate embodiments one or more dopants may be added to the filler to render it electrically conducting.

The filler may be characterized by a Curie temperature and may have ferroelectric characteristics, piezoelectric characteristics or both ferroelectric and piezoelectric characteristics. The Curie temperature, of a ferromagnetic filler is the temperature above which it loses its characteristic ferromagnetic ability, that is the ability to possess a net (spontaneous) magnetization in the absence of an external magnetic field. The Curie temperature of a piezoelectric filler is the temperature above which the material may lose its spontaneous polarization and piezoelectric characteristics.

Suitable fillers may include a ceramic material. A ceramic material may be partially or entirely inorganic. In one embodiment, the ceramic material may include a metal oxide, a mixed metal oxide, or both a metal oxide and a mixed metal oxide. Metal oxides or mixed metal oxides in the ceramic material may be derived from one or more of alkaline earth metals, transition metals, or post-transition metals. Cermets, which are a metal-based ceramic, are suitable ceramic materials in some embodiments.

Suitable alkaline earth metals may include one or more of barium (Ba), beryllium (Be), calcium (Ca), magnesium (Mg), radium (Ra), or strontium (Sr). Suitable transition metals may include one or more of titanium (Ti), zirconium (Zr), hafnium (Hf) scandium (Sc) vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os) cobalt (Co), rhodium (Rh), iridium (Ir), nickel (Ni), palladium (Pd), platinum (Pt), copper (Cu), silver (Ag), gold (Au), zinc (Zn), cadmium (Cd), oryttrium (Y). Suitable post-transition metals may include one or more of aluminium (Al), antimony (Sb), bismuth (Bi), gallium (Ga), germanium (Ge), indium (In), lead (Pb), polonium (Po), thallium (Th), or tin (Sn).

In one embodiment, the filler may include a metal oxide or a mixed metal oxide derived from one or more of barium, calcium, magnesium, lead, strontium, titanium, tin, zirconium, hafnium, or combinations of two or more thereof. In one embodiment, the filler may include a mixed metal oxide having a structure of formula (I):

$$ABO_3 \quad (I)$$

wherein "A" may include one or more divalent metals such as barium, calcium, lead, strontium, magnesium or zinc; and "B" may include one or more tetravalent metals such as titanium, tin, zirconium, or hafnium.

In one embodiment, the filler may include a mixed metal oxide having a structure of formula (II)

$$Ba_{(1-x)}A_xTi_{(1-y)}B_yO_3 \quad (II)$$

wherein "A" may include one or more divalent metal other than barium, such as, lead, calcium, strontium, magnesium, or zinc; "B" may include one or more tetravalent metals other than titanium such as tin, zirconium, or hafnium; and "x" and "y" may be independently at each occurrence either 0 or 1. In one embodiment, "x" and "y" may be 0. In one embodiment, "x" and "y" may be independently at each occurrence a fractional number that is about 0.1. In one embodiment, "x" and "y" may be independently at each occurrence a fractional number in a range of from about 0.1 to about 0.25. In one embodiment, "x" and "y" may be independently at each occurrence a fractional number in a range of from about 0.25 to about 0.5. In one embodiment, "x" and "y" may be independently at each occurrence a fractional number in a range of from about 0.5 to about 0.75. In one embodiment, "x" and "y" may be independently at each occurrence a fractional number in a range of from about 0.75 to about 1. In one embodiment, "x" and "y" may be independently at each occurrence a fractional number greater than about 1.0.

In embodiments where the divalent or tetravalent metals may be present as impurities, the value of "x" and "y" may be small. Small is, for example, less than 0.1. In embodiments where the divalent or tetravalent metals may be introduced at higher levels to provide a significantly identifiable compound such as barium-calcium titanate, barium-strontium titanate, barium titanate-zirconate and the like, the value of "x" and "y" may be greater than about 0.1. In embodiments where barium or titanium is completely replaced by the alternative metal of appropriate valence to provide a compound otherwise similar to lead titanate or barium zirconate, the value of "x" or "y" may be equal to about 1.0. In one embodiment, the mixed metal oxide may have multiple partial substitutions of barium or titanium. An example of such a multiple partial substituted composition may be represented by a structure of formula (III)

$$Ba_{(1-x-t-u)}Pb_xCa_tSr_uO.Ti_{(1-y-v-w)}Sn_yZr_vHf_wO_2 \quad (III)$$

wherein "t", "u", "v", "w", "x", "y" may be independently an integer in a range of from about 0 to about 1.

In one embodiment, the filler may include one or more of barium titanate, lead titanate, strontium titanate, barium strontium titanate, barium lead titanate, barium tin titanate, strontium lead titanate, strontium tin titanate, lead tin titanate, or combinations of two or more thereof. In one embodiment, the filler may consist essentially of barium titanate. In certain embodiments, the barium titanate-based filler may have a perovskite crystal structure. In one embodiment, the filler may consist essentially of polycrystalline barium titanate.

The filler may include a plurality of particles. The plurality of particles may be characterized by one or more of average particle size, particle size distribution, average particle surface area, particle shape, or particle cross-sectional geometry.

In one embodiment, an average particle size of the filler may be less than about 1 nanometer. In one embodiment, an average particle size of the filler may be in a range of from about 1 nanometer to about 10 nanometers, from about 10 nanometers to about 25 nanometers, from about 25 nanometers to about 50 nanometers, from about 50 nanometers to about 75 nanometers, or from about 75 nanometers to about 100 nanometers. In one embodiment, an average particle size of the filler may be in a range of from about 0.1 micrometers to about 0.5 micrometers, from about 0.5 micrometers to about 1 micrometer, from about 1 micrometer to about 5 micrometers, from about 5 micrometer to about 10 micrometers, from about 10 micrometers to about 25 micrometers, or from about 25 micrometer to about 50 micrometers. In one embodiment, an average particle size of the filler may be in a range of from about 50 micrometers to about 100 micrometers, from about 100 micrometers to about 200 micrometer, from about 200 micrometer to about 400 micrometers, from about 400 micrometer to about 600 micrometers, from about 600 micrometers to about 800 micrometers, or from about 800 micrometers to about 1000 micrometers. In one embodiment, an average particle size of the filler may be in a range of greater than about 1000 micrometers.

Filler particle morphology can be selected to include shapes and cross-sectional geometries based on the process used to produce the particles. In one embodiment, a filler particle may be a sphere, a rod, a tube, a flake, a fiber, a plate, a whisker, or be part of a plurality that includes combinations of two or more thereof. In one embodiment, a cross-sectional geometry of the particle may be one or more of circular, ellipsoidal, triangular, rectangular, or polygonal. In one embodiment, the filler may consist essentially of spherical particles.

In one embodiment, the fillers may be aggregates or agglomerates prior to incorporation into the composition, or after incorporation into the composition. An aggregate may include more than one filler particle in physical contact with one another, while an agglomerate may include more than one aggregate in physical contact with one another. In some embodiments, the filler particles may not be strongly agglomerated and/or aggregated such that the particles may be relatively easily dispersed in the polymeric matrix. The filler particles may be subjected to mechanical or chemical processes to improve the dispersibility of the filler in the polymer matrix. In one embodiment, the filler may be subjected to a mechanical process, for example, high shear mixing prior to dispersing in the polymer matrix. In one embodiment, the filler particles may be chemically treated prior to dispersing in the polymeric matrix. Chemical treatment may include removing polar groups from one or more surfaces of the filler particles to reduce aggregate and/or agglomerate formation. Polar groups may include hydroxyl groups and surface amines. Chemical treatment may also include functionalizing one or more surfaces of the filler particles with functional groups that may improve the compatibility between the fillers and the polymeric matrix, reduce aggregate and/or agglomerate formation, or both improve the compatibility between the fillers and the polymeric matrix and reduce aggregate and/or agglomerate formation. Suitable surface functional groups may include one or more of silanes, titanates, zirconates, or combinations of two or more thereof.

Ceramic filler particles may be produced by one or more of hydrothermal processes, solid-state reaction processes, sol-gel processes, as well as precipitation and subsequent calcination processes, such as oxalate-based processes. In one embodiment, barium titanate-based particles may be used as fillers and the barium titanate-based particles may be produced using a hydrothermal process. Hydrothermal processes may involve mixing a barium source with a titanium source in an aqueous environment to form a hydrothermal reaction mixture, which is maintained at an elevated temperature. Barium may react with titanium to form barium titanate particles that may remain dispersed in the aqueous environment to form a slurry. The particles may be washed to remove excess barium ions from the hydrothermal process while being maintained in a slurry. The particles in the slurry may be subjected to further processing steps (for example, dried and/or heat treated) and/or maintained in the slurry until the coating process. When forming barium titanate solid solution particles hydrothermally, sources including the appropriate divalent or tetravalent metal may also added to the hydrothermal reaction mixture. Certain hydrothermal processes may be used to produce substantially spherical barium titanate-based particles having a particle size of less than 1 micrometer and a uniform particle size distribution.

Optionally, the filler may include a dopant that is incorporated, surface-deposited, or coated thereon. A dopant may include a metal cation that may provide the desired electrical properties, mechanical properties, or both electrical and mechanical properties to the ceramic material. Metal cations may be present in the form of oxides, hydroxides, or both oxides and hydroxides.

In one embodiment, dopant may include cations of one or more of rare earth metals, alkaline earth metals, transition metals, or post-transition metals. Suitable rare earth metals may include lanthamides, actinides, or both lanthamides and actinides. Suitable lanthamides may include one or more of lanthanum, cerium, praseodymium, neodymium, promethium, samarium, europium, gadolinium, terbium, dysprosium, holmium, erbium, thulium, ytterbium, or lutetium. Suitable alkaline earth metals may include one or more of beryllium (Be), magnesium (Mg), calcium (Ca), strontium (Sr), barium (Ba), or radium (Ra). Transition metals may include one or more of titanium (Ti), zirconium (Zr), hafnium (Hf) scandium (Sc) vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os) cobalt (Co), rhodium (Rh), iridium (Ir), nickel (Ni), palladium (Pd), platinum (Pt), copper (Cu), silver (Ag), gold (Au), zinc (Zn), cadmium (Cd), oryttrium (Y). Suitable post-transition metals may include one or more of aluminium (Al), gallium (Ga), indium (In), tin (Sn), thallium (Th), lead (Pb), bismuth (Bi), germanium (Ge), antimony (Sb), or polonium (Po).

In one embodiment, the dopant may include cations of one or more of lanthanum, niobium, antimony, scandium, yttrium, neodynium, samarium, or manganese. In one embodiment, the dopant may consist essentially of the lanthanum cation. In one embodiment, the dopant may consist essentially of the antimony cation. In one embodiment, the dopant may consist essentially of the niobium cation. In one embodiment, the dopant may consist essentially of both the niobium and manganese cations.

In one embodiment, a dopant may be added to the ceramic material by coating the surface of ceramic particles with a solution including one or more dopant materials. In one embodiment, a dopant may be added to the ceramic material by coating the surface of ceramic particles with a plurality of dopant solutions. In one embodiment, a dopant may be added to the ceramic material by simple mixing or by ball mixing. The dopant may be present essentially on the surface of a ceramic particle or may be incorporated into the interstices of the ceramic particles.

The dopant may be present in amount greater than about 0.1 atomic percent of the filler. In one embodiment, the dopant may be present in an amount in a range of from about 0.1 atomic percent to about 0.2 atomic percent of the filler, from about 0.2 atomic percent to about 0.25 atomic percent of the filler, from about 0.25 atomic percent to about 0.5 atomic percent of the filler, or from about 0.5 atomic percent to about 1 atomic percent of the filler. In one embodiment, the dopant may be present in amount in a range of from about 1 atomic percent to about 2 atomic percent of the filler, from about 2 atomic percent to 2.5 atomic percent of the filler, from about 2.5 atomic percent to about 3 atomic percent of the filler, from about 3 atomic percent to about 4 atomic percent of the filler, or from about 4 atomic percent to about 5 atomic percent of the filler. In one embodiment, the dopant may be present in amount greater than about 5 atomic percent of the filler. In one embodiment, the dopant may be present in an amount in a range of from about 0.1 atomic percent to about 0.5 atomic percent of the filler.

Electrical properties of the filler may be characterized by one or more of: Curie temperature, room temperature electrical resistance, positive temperature coefficient of resistance, positive temperature coefficient of resistance intensity, or maximum resistance. FIG. 1 illustrates the different electrical characteristics of filler by plotting the changes in electrical resistance of the filler as a function of temperature (curve 10). In the initial part of the first curve 12, the electrical resistance of the filler does not change appreciably with increase in temperature and there is a slight decrease in resistance with increase in temperature. At a temperature indicated by point 20, there is a sharp rate increase in electrical resistance as shown in second curve 14. Drawing tangents to the curves 12 and 14 obtains a Curie temperature value 20 ($T_c$). A $T_c$ temperature 20 corresponds to the point where tangents to the first curve 12 and the second curve 14 intersect. At another temperature point 22, the filler reaches its maximum electrical resistance and the resistance reaches a nearly stable value or slightly decreases with increase in temperature, shown by curve 16. The value of the inflection temperature 22 is obtained by drawing tangents to the curves 14 and 16. Inflection temperature 22 corresponds to the point where tangents to the curves 14 and 16 intersect. In FIG. 1, the electrical resistance of the filler at room temperature 24 is indicated by reference number 30 and the maximum resistance attained at inflection temperature 22 is indicated by reference number 32. The ratio of the maximum electrical resistance 32 to electrical resistance at room temperature is defined as positive temperature coefficient of resistance intensity (PTCR intensity). In one embodiment, the Tc temperature 20 may correspond to the Curie temperature.

Electrical properties of the filler may be determined by filler characteristics, such as, filler type, crystalline structure, dopant amount, and the like. In one embodiment, the type of ceramic; dopant material, or both the filler material and the dopant material determine the filler electrical properties.

In one embodiment, a Curie temperature of the filler may be in a range of less than about 20 degrees Celsius. In one embodiment, a Curie temperature of the filler may be in a range of from about 20 degrees Celsius to about 40 degrees Celsius, from about 40 degrees Celsius to about 60 degrees Celsius, from about 60 degrees Celsius to about 80 degrees Celsius, from about 80 degrees Celsius to about 100 degrees Celsius, or from about 80 degrees Celsius to about 120 degrees Celsius. In one embodiment, a Curie temperature of the filler may be in a range of from about 120 degrees Celsius to about 140 degrees Celsius, from about 140 degrees Celsius to about 160 degrees Celsius, from about 160 degrees Celsius to about 180 degrees Celsius, or from about 180 degrees Celsius to about 200 degrees Celsius. In one embodiment, a Curie temperature of the filler may be in a range of from about 200 degrees Celsius to about 220 degrees Celsius, from about 220 degrees Celsius to about 240 degrees Celsius, from about 240 degrees Celsius to about 260 degrees Celsius, from about 260 degrees Celsius to about 280 degrees Celsius, or from about 280 degrees Celsius to about 300 degrees Celsius. In one embodiment, a Curie temperature of the filler may be in a range of from about 300 degrees Celsius to about 320 degrees Celsius, from about 320 degrees Celsius to about 340 degrees Celsius, from about 340 degrees Celsius to about 360 degrees Celsius, from about 360 degrees Celsius to about 380 degrees Celsius, or from about 380 degrees Celsius to about 400 degrees Celsius.

In one embodiment, an electrical resistance of filler having a diameter of 20 millimeters and a thickness of 2.5 millimeters may be measured using the ASTM-D4496 procedure with reference to the ASTM-D257 procedure. In one embodiment, a filler may have a room temperature electrical resistance in a range of less than about 1 kilo Ohm. In one embodiment, the filler may have a room temperature electrical resistance in a range of from about 1 kilo Ohm to about 5 kilo Ohms, from about 5 kilo Ohms to about 10 kilo Ohms, from about 10 kilo Ohms to about 25 kilo Ohms, from about 25 kilo Ohms to about 50 kilo Ohms, from about 50 kilo Ohms to about 75 kilo Ohms, or from about 75 kilo Ohms to about 100 kilo Ohms. In one embodiment, the filler may have a room temperature electrical resistance greater than about 100 kilo Ohms.

An electrical resistance of the filler at the Curie temperature may be greater than the electrical resistance of the filler at room temperature. In one embodiment, the difference in the factor is greater than about 1.5. In one embodiment, an electrical resistance of the filler at the Curie temperature is greater than an electrical resistance of the filler at the room temperature by a factor in a range of from about 1.5 to about 2, from about 2 to about 5, from about 5 to about 10, from about 10 to about 20, from about 20 to about 40, from about 40 to about 60, from about 60 to about 80, or from about 80 to about 100. In one embodiment, an electrical resistance of the filler at the Curie temperature is greater than an electrical resistance of the filler at the room temperature by a factor that is greater than about 100.

The filler may be present in the polymeric matrix in an amount determined by a property of one or both of the polymeric matrix or the filler. In one embodiment, the filler may be present in the polymeric matrix in an amount determined by the chemical structure of the polymeric matrix, the amount of crystallization in the polymeric matrix, the number average molecular weight of the polymeric matrix, the presence or absence of branching in the polymeric matrix, or the presence or absence of cross-linking in the polymeric matrix. In one embodiment, the filler may be present in the polymeric matrix in an amount determined by one or more of the size of the filler, shape of the filler, chemical characteristics of the filler, or electrical properties of the filler.

In one embodiment, the filler may be present in amount in a range of less than about 10 weight percent of the composition. In one embodiment, the filler may be present in amount in a range of from about 10 weight percent to about 20 weight percent of the composition, from about 20 weight percent to about 30 weight percent of the composition, from about 30 weight percent to about 40 weight percent of the composition, or from about 40 weight percent to about 50 weight percent. In one embodiment, the filler may be present in amount in a range of from about 50 weight percent to about 55 weight percent of the composition, from about 55 weight percent to about 65 weight percent of the composition, from about 65 weight percent to about 75 weight percent of the composition, from about 75 weight percent to about 95 weight percent of the composition, or from about 95 weight percent to about 99 weight percent of the composition. In one embodiment, the filler may be present in amount in a range of from about 75 weight percent to about 90 weight percent of the composition.

The composition may further include one or more additional electrically conducting fillers. A second conductive filler may not have an inherent positive temperature coefficient of resistance (PTCR) property, but rather may be merely electrically conductive. The second electrically conducting filler may be carbonaceous. In one embodiment, the carbonaceous electrically conductive filler may include one or more of carbon black, carbon nanotubes, graphite, or combinations of two or more thereof.

Carbon black used as second electrically conductive fillers may include one or more carbon blacks commercially available from Columbian Chemicals under the trade name CONDUCTEX®; the acetylene black available from Chevron Chemical, under the trade names S.C.F. (Super Conductive Furnace) and E.C.F.® (Electric Conductive Furnace); the carbon blacks available from Cabot Corp. under the trade names VULCAN XC72® and BLACK PEARLS®; the carbon blacks commercially available from Degussa under the tradename of PRINTEX®, carbon blacks available from Timcal under the tradename of ENSACO®, or the carbon blacks commercially available from Akzo Co. Ltd under the trade names KETJEN BLACK EC 300® and EC 600® respectively.

Carbon nanotubes may include single wall carbon nanotubes, multiwall carbon nanotubes, or the like. In one embodiment, the carbon nanotubes may have aspect ratios in a range of greater than or equal to about 2. In one embodiment, the carbon nanotubes may have aspect ratios in a range of greater than or equal to about 100. In another embodiment, the carbon nanotubes may have aspect ratios in a range of greater than or equal to about 1,000. In one embodiment, the carbon nanotubes may have an average diameter in a range of from about 2 nanometers to about 500 nanometers. In one embodiment, the carbon nanotubes may have average diameters in a range from about 5 nanometers to about 100 nanometers. In one embodiment, the carbon nanotubes may have an average diameter in a range from about 10 nanometers to about 70 nanometers Graphite fibers may be obtained from the pyrolysis of pitch or polyacrylonitrile (PAN) based fibers. Graphite fibers having an average diameter in a range from about 1 micrometer to about 30 micrometers and an average length in a range from about 0.5 millimeters to about 2 centimeters may be used as second conducting fillers.

The second electrically conducting filler may be a metal particulate, a metal-coated filler, or both a metal particulate and a metal-coated filler. Suitable metal fillers include one or more of silver, vanadium, tungsten, nickel, or the like, or a combination of two or more thereof. Metal alloys may also be used as secondary conducting fillers in the composition. Suitable metal alloys include stainless steel, neodymium iron boron (NdFeB), samarium cobalt (SmCo), aluminum nickel cobalt (AlNiCo), titanium boride (TiB$_2$) or a combination of two or more thereof.

In one embodiment, non-conductive, non-metallic fillers that have been coated over a substantial portion of their surface with a coherent layer of solid conductive metal may be used as the second electrically conductive filler. The non-conductive, non-metallic fillers coated with a layer of solid conductive metal are "metal-coated fillers". Conductive metals such as aluminum, copper, magnesium, chromium, tin, nickel, silver, iron, titanium, or the like, or a combination of two or more thereof may be used to coat the non-conductive, non-metallic fillers. A non-conductive, non-metallic fillers may include one or more of silica powder, such as fused silica and crystalline silica, colloidal silica which may be further passivated and compatibilized, boron-nitride powder, boron-silicate powders, alumina, magnesium oxide (or magnesia), wollastonite, including surface treated wollastonite, calcium sulfate (as its anhydride, dihydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, mica, feldspar, silicate spheres, flue dust, cenospheres, fillite, aluminosilicate (armospheres), natural silica sand, quartz, quartzite, perlite, tripoli, diatomaceous earth, synthetic silica, or the like, or a combination comprising at least one of the foregoing substrates. All of the aforementioned non-conducting fillers may be coated with a layer of metallic material for use as the second electrically conductive filler.

The second electrically conductive filler may be present in an amount that is less than a percolation limit. The percolation limit is a concentration of the second electrically conductive filler above which the filler may provide a continuous electrically conducting path across the composition. In one embodiment, the second conductive filler may be present in amount less than about 25 weight percent of the composition. In one embodiment, the second conductive filler may be present in amount in a range of from about 1 weight percent of the composition to about 2 weight percent of the composition, from about 2 weight percent of the composition to about 5 weight percent of the composition, from about 5 weight percent of the composition to about 10 weight percent of the composition, or from about 10 weight percent of the composition to about 25 weight percent of the composition.

In one embodiment, an average particle size of the second conductive filler may be in a range of less than about 1 nanometer. In one embodiment, an average particle size of the second conductive filler may be in a range of from about 1 nanometer to about 10 nanometers, from about 10 nanometers to about 25 nanometers, from about 25 nanometers to about 50 nanometers, from about 50 nanometers to about 75 nanometers, or from about 75 nanometers to about 100 nanometers. In one embodiment, an average particle size of the second conductive filler may be in a range of from about 0.1 micrometers to about 0.5 micrometers, from about 0.5 micrometers to about 1 micrometer, from about 1 micrometer to about 5 micrometers, from about 5 micrometer to about 10 micrometers, from about 10 micrometers to about 25 micrometers, or from about 25 micrometer to about 50 micrometers. In one embodiment, an average particle size of the second conductive filler may be in a range of from about 50 micrometers to about 100 micrometers, from about 100 micrometers to about 200 micrometer, from about 200 micrometer to about 400 micrometers, from about 400 micrometer to about 600 micrometers, from about 600 micrometers to about 800 micrometers, or from about 800 micrometers to about 1000 micrometers. In one embodiment, an average particle size of the second conductive filler is greater than about 1000 micrometers.

A polymeric matrix may include one or more of an amorphous polymer, a thermoplastic polymer, an organic polymer, or combinations of two or more thereof. A suitable polymeric matrix may include one or more of a crystalline polymer, a thermoset polymer, an inorganic polymer, or a combination of two or more thereof.

A suitable organic polymer may include carbon-carbon linkages (for example, polyolefins) or carbon-heteroatom-carbon linkages (for example, polyethers, polyesters and the like) in the main chain. A suitable inorganic polymer may include main chain linkages other than that of carbon-carbon linkages or carbon-heteroatom-carbon linkages, for example, silicon-oxygen-silicon linkages in polysiloxanes. In one embodiment, the polymeric matrix consists essentially of an organic polymer.

A suitable amorphous polymer may include less than that about 5 weight percent of crystalline weight fraction. A suitable amorphous polymer may include less than that bout 2 weight percent of crystalline weight fraction. A suitable amorphous polymer may include less than that about 1 weight percent of crystalline weight fraction. A suitable amorphous polymer may include less than that about 0.5 weight percent of crystalline weight fraction. A suitable amorphous polymer may include less than that about 0.1 weight percent of crystalline weight fraction. A suitable crystalline polymer may include greater than that about 5 weight percent of crystalline weight fraction. A suitable crystalline polymer may include greater than that about 10 weight percent of crystalline weight fraction. A suitable crystalline polymer may include greater than that about 25 weight percent of crystalline weight fraction. A suitable crystalline polymer may include greater than that about 50 weight percent of crystalline weight fraction. A suitable crystalline polymer may include greater than that about 75 weight percent of crystalline weight fraction. In one embodiment, the polymeric matrix consists essentially of an amorphous polymer.

A "thermoset polymer" solidifies when first heated under pressure, and thereafter may not melt or mold without destroying the original characteristics. Suitable thermosetting polymeric materials may include one or more epoxides, phenolics, melamines, ureas, polyurethanes, polysiloxanes, or polymers including a suitable crosslinkable functional moiety.

A thermoplastic polymer has a macromolecular structure that repeatedly softens when heated and hardens when cooled. Illustrative examples of thermoplastic polymeric materials include one or more of olefin-derived polymers, for example, polyethylene, polypropylene, and their copolymers; polymethylpentane-derived polymers, for example, polybutadiene, polyisoprene, and their copolymers; polymers of unsaturated carboxylic acids and their functional derivatives, for example, acrylic polymers such as poly(alkyl acrylates), poly(alkyl methacrylate), polyacrylamides, polyacrylonitrile, and polyacrylic acid; alkenylaromatic polymers, for example polystyrene, poly-alpha-methylstyrene, polyvinyltoluene, and rubber-modified polystyrenes; polyamides, for example, nylon-6, nylon-66, nylon-11, and nylon-12; polyesters, such as, poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and poly(alkylene arenedioates); polycarbonates; co-polycarbonates; co-polyestercarbonates; polysulfones; polyimides; polyarylene sulfides; polysulfide sulfones; and polyethers such as polyarylene ethers, polyphenylene ethers, polyethersulfones, polyetherimides, polyetherketones, polyetheretherketones; or blends or copolymers thereof.

In one embodiment, the polymeric matrix consists essentially of a thermoplastic polymer. In one embodiment, the polymeric matrix consists essentially of polyamide, polystyrene, polyalkylacrylate, polyester, polyetherimide, or polycarbonate.

The average molecular weight of the polymeric matrix depends upon one or more of the desired end-use properties of the composition, the conditions to be used during processing of the composition, or degree of compatibility between the different components of the composition. In one embodiment, the number average molecular weight of the polymer matrix may be in a range greater than about $10^4$ grams/mole. In one embodiment, the number average molecular weight of the polymer matrix may be in a range from about $10^4$ grams/mole to about $5 \times 10^4$ grams/mole, from about $5 \times 10^4$ grams/mole to about $10^5$ grams/mole, from about $10^5$ grams/mole to about $2.5 \times 10^5$ grams/mole, from about $2.5 \times 10^5$ grams/mole to about $5 \times 10^5$ grams/mole, or from about $5 \times 10^5$ grams/mole to about $10^6$ grams/mole. In one embodiment, the number average molecular weight of the polymer matrix is greater than about $10^6$ grams/mole.

Optionally, the composition may include one or more additives. The additives may include one or more of flow control agents, modifiers, carrier solvents, viscosity modifiers, adhesion promoters, ultra-violet absorbers, flame-retardants, or reinforcing fillers.

The composition has a trip temperature ($T_{TRIP}$) at which electrical resistance of the composition increases with increase in temperature, and the trip temperature of the composition may be determined by the Curie temperature of the filler. The composition may be characterized by electrical properties including one or more of: room temperature electrical resistance, positive temperature coefficient of resistance, positive temperature coefficient of resistance intensity, or maximum resistance.

Figure 2:
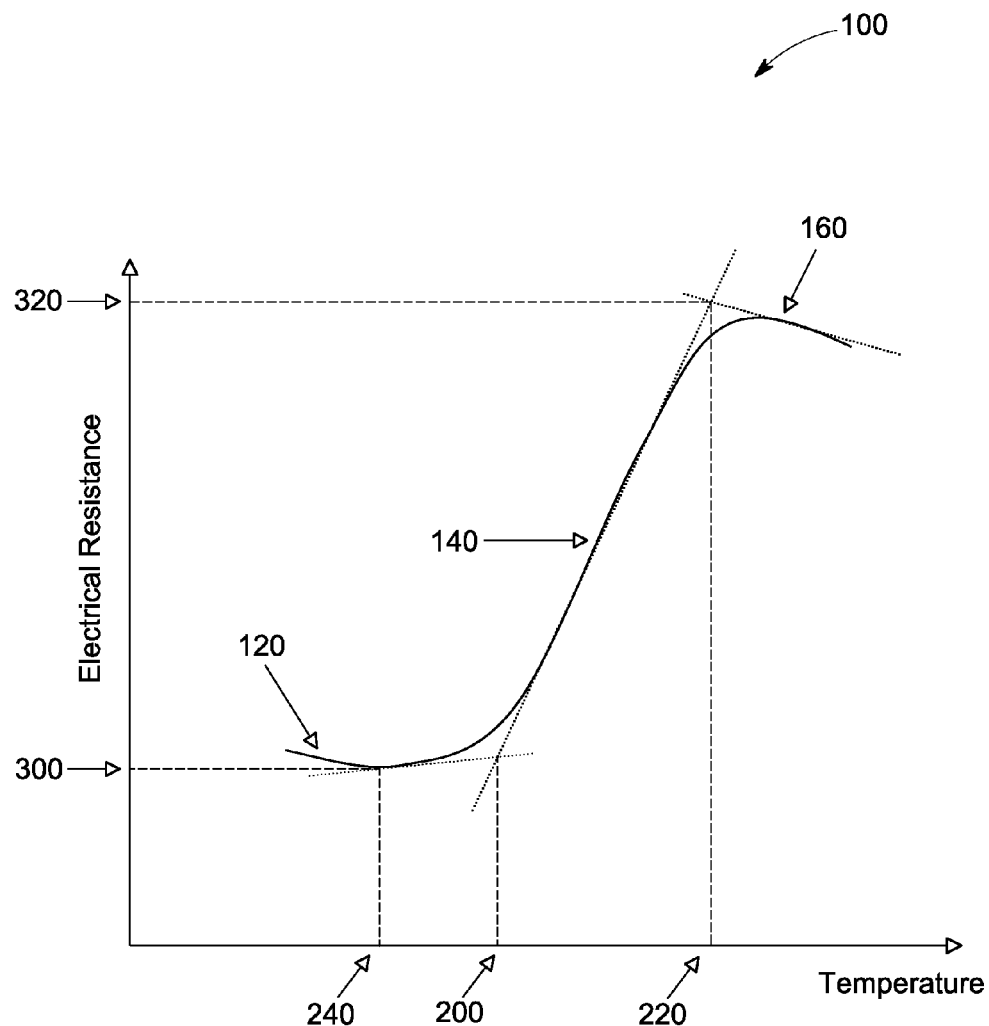
FIG. 2 is a plot of electrical resistance of a composition as function of increase in temperature.

FIG. 2 illustrates differing electrical characteristics of a composition embodiment by plotting the changes in electrical resistance of the composition as a function of temperature (curve 100). In the initial part of the first curve 120, the electrical resistance of the composition does not vary too much with increase in temperature and there is a slight decrease in resistance with increase in temperature. At a temperature indicated by point 200, there is a sudden increase in electrical resistance as shown in second curve 140. The value of temperature ($T_{TRIP}$) 200 is obtained by drawing tangents to the curves 120 and 140. Temperature ($T_{TRIP}$) 200 corresponds to the point where tangents to the curves 120 and 140 intersect. At an inflection temperature 220, the composition reaches its maximum electrical resistance and the resistance reaches a nearly stable value or slightly decreases with increase in temperature, as shown by curve 160. The value of inflection temperature 220 is obtained by drawing tangents to the curves 140 and 160. An inflection temperature 220 corresponds to the point where tangents to the curves 140 and 160 intersect. In FIG. 2, the electrical resistance of the composition at room temperature 240 (RT) is indicated by reference number 300 and the maximum resistance attained at temperature 220 is indicated by reference number 320. The ratio of the maximum electrical resistance 320 to electrical resistance at room temperature 300 is defined as positive temperature coefficient of resistance intensity (PTCR intensity). In one embodiment, the electrical resistance of the composition at temperature 220 may reach a constant value with increase in temperature. In one embodiment, the electrical resistance of the composition may decrease with increase on temperature, and the composition may show a negative temperature coefficient of resistance.

In one embodiment, the trip temperature 200 ($T_{TRIP}$) may be based on the Curie temperature of the filler. In one embodiment, the trip temperature of the composition may be equal to the Curie temperature of the filler. A trip temperature of the composition may be tuned or adjusted by changing the Curie temperature of the filler. In one embodiment, a Curie temperature of the filler and the trip temperature of the composition may be lowered by addition of strontium to the filler. In one embodiment, a Curie temperature of the filler and the trip temperature of the composition may be increased by addition of lead to the filler. In one embodiment, a trip temperature ($T_{TRIP}$) of the composition may be independent of the polymer properties or characteristics.

A suitable trip temperature of the composition can be greater than about 20 degrees Celsius. In one embodiment, a trip temperature of the composition may be in a range of from about 20 degrees Celsius to about 40 degrees Celsius, from about 40 degrees Celsius to about 60 degrees Celsius, from about 60 degrees Celsius to about 80 degrees Celsius, from about 80 degrees Celsius to about 100 degrees Celsius, or from about 80 degrees Celsius to about 120 degrees Celsius. In one embodiment, a trip temperature of the composition may be in a range of from about 120 degrees Celsius to about 140 degrees Celsius, from about 140 degrees Celsius to about 160 degrees Celsius, from about 160 degrees Celsius to about 180 degrees Celsius, or from about 180 degrees Celsius to about 200 degrees Celsius. In one embodiment, a trip temperature of the composition may be in a range of from about 200 degrees Celsius to about 220 degrees Celsius, from about 220 degrees Celsius to about 240 degrees Celsius, from about 240 degrees Celsius to about 260 degrees Celsius, from about 260 degrees Celsius to about 280 degrees Celsius, or from about 280 degrees Celsius to about 300 degrees Celsius. In one embodiment, a trip temperature of the composition may be in a range of from about 300 degrees Celsius to about 320 degrees Celsius, from about 320 degrees Celsius to about 340 degrees Celsius, from about 340 degrees Celsius to about 360 degrees Celsius, from about 360 degrees Celsius to about 380 degrees Celsius, or from about 380 degrees Celsius to about 400 degrees Celsius.

The filler characteristics and filler amount can affect the room temperature electrical resistance of the composition. In certain embodiments, a desired room temperature resistance may be obtained without changing the trip temperature by a corresponding change in the filler amount. An increase in filler amount may result in an increase in the room temperature electrical resistance of the composition and a decrease in filler amount may result in a decrease in the room temperature electrical resistance of the composition. In one embodiment, the composition may have a room temperature electrical resistance in a range of less than about 1 Mega Ohm. In one embodiment, the composition may have a room temperature electrical resistance in a range of from about 1 Mega Ohm to about 5 Mega Ohms, from about 5 Mega Ohms to about 10 Mega Ohms, from about 10 Mega Ohms to about 25 Mega Ohms, from about 25 kilo Ohms to about 50 Mega Ohms, from about 50 Mega Ohms to about 75 Mega Ohms, or from about 75 Mega Ohms to about 100 Mega Ohms. In one embodiment, a maximum resistance (320) of the composition may be independent of the polymer properties or characteristics and may depend on one or more characteristics of the filler.

PTCR intensity or a ratio of the maximum electrical resistance to electrical resistance at room temperature may also be changed by changing filler characteristics or filler amount. In one embodiment a PTCR intensity may be varied by varying a maximum resistance of the composition. Controlling the room temperature resistance of the composition allows control over the PTCR intensity. In certain embodiments, a desired PTCR intensity may be obtained without changing the trip temperature by varying the filler amount and varying the room temperature resistance. An electrical resistance of the composition at the trip temperature can be greater than an electrical resistance of the composition at the room temperature by a factor in a range of greater than about 1.5. In one embodiment, an electrical resistance of the composition at the trip temperature is greater than an electrical resistance of the composition at the room temperature by a factor in a range of from about 1.5 to about 2, from about 2 to about 5, from about 5 to about 10, from about 10 to about 20, from about 20 to about 40, from about 40 to about 60, from about 60 to about 80, or from about 80 to about 100. In one embodiment, an electrical resistance of the composition at the trip temperature is greater than an electrical resistance of the composition at the room temperature by a factor in a range of from about 100 to about 200, from about 200 to about 400, from about 400 to about 600, from about 600 to about 800, or from about 800 to about 1000. In one embodiment, an electrical resistance of the composition at the trip temperature is greater than an electrical resistance of the composition at the room temperature by a factor in a range of greater than about 1000.

In addition to the electrical properties, one may characterize the composition or more of: modulus, toughness, strain at break, tensile strength, thermal conductivity, chemical resistance, scratch resistance, flame retardance, viscosity, and/or processability.

Depending upon the processing conditions and the end-use applications envisaged for the compositions, the melt-viscosity of the composition may be tuned. The melt viscosity of the composition may be adjusted by varying one or more of: polymer molecular weight, weight fraction of filler in the composition, or flow-enhancing diluents. In one embodiment, the composition may have a melt viscosity in range of less than about 10 Pascal·seconds at 1500 seconds$^{-1}$ shear rate. In one embodiment, the composition may have a melt viscosity in a range from about 10 Pascal·seconds to about 50 Pascal·seconds, from about 50 Pascal·seconds to about 100 Pascal·seconds, from about 100 Pascal·seconds to about 250 Pascal·seconds, from about 250 Pascal·seconds to about 500 Pascal·seconds, or from about 500 Pascal·seconds to about 1000 Pascal·seconds, at 1500 seconds$^{-1}$ shear rate. In one embodiment, the composition may have a melt viscosity in range of greater than about 1000 Pascal·seconds at 1500 seconds$^{-1}$ shear rate.

In one embodiment, the composition may be processed by one or more of injection molding, blow molding, in-line molding, extrusion, or compression-injection molding. In one embodiment, the composition may be fabricated into articles of any desired shape or size by a molding method. In one embodiment, the composition is not sintered during formation of an end-use article.

In one embodiment a method of making a composition is provided. The method may include dispersing a filler in a polymeric matrix to form a composition. The filler may be electrically conducting and may have a Curie temperature. The composition may have a trip temperature, and an electrical resistance of the composition may increase with an increase in temperature to greater than the trip temperature. The method may further include tuning the trip temperature of the composition by changing the filler Curie temperature. The method may also include tuning the room temperature resistance or PTCR intensity by changing the filler amount.

The polymeric matrix, the filler, and optionally any other secondary conductive fillers, may be processed by melt blending, solution blending, or both melt blending and solution blending. Melt blending of the composition may involve the use of one or more of shear force, extensional force, compressive force, ultrasonic energy, electromagnetic energy, or thermal energy. Melt blending may be conducted in a processing equipment wherein the aforementioned forces may be exerted by one or more of single screw, multiple screws, intermeshing co-rotating or counter rotating screws, non-intermeshing co-rotating or counter rotating screws, reciprocating screws, screws with pins, barrels with pins, rolls, rams, or helical rotors.

Melt blending involving the aforementioned forces may be conducted in one or more of single or multiple screw extruders, Buss kneader, Henschel, helicones, Ross mixer, Banbury, roll mills, molding machines such as injection molding machines, vacuum forming machines, blow molding machine, or the like. During melt or solution blending of the polymeric matrix and the conductive filler a specific energy in a range from about 0.01 to about 10 kilowatt-hour/kilogram (kwhr/kg) may be imparted to the composition.

In one embodiment, the polymeric matrix in powder form, pellet form, sheet form, or the like, may be first dry blended with the electrically conducting filler composition in a Henschel or a roll mill, prior to being fed into a device such as an extruder or Buss kneader. In another embodiment, the electrically conducting filler composition may be introduced into the melt-blending device in the form of a masterbatch. In such a process, the masterbatch may be introduced into the melt-blending device at the throat or downstream of the polymeric matrix or both.

In one embodiment, a masterbatch may be used. In one embodiment, the conducting filler may be present in the masterbatch in an amount in a range of greater than about 1 weight percent of the total weight of the masterbatch. In one embodiment, the conducting filler may be present in the masterbatch in an amount in a range from about 1 weight percent to about 5 weight percent of the total weight of the masterbatch, from about 5 weight percent to about 10 weight percent of the total weight of the masterbatch, from about 10 weight percent to about 20 weight percent of the total weight of the masterbatch, from about 20 weight percent to about 30 weight percent of the total weight of the masterbatch, from about 30 weight percent to about 50 weight percent of the total weight of the masterbatch. In one embodiment, the conducting filler may be present in the masterbatch in an amount in a range of greater than about 50 weight percent of the total weight of the masterbatch. The second electrically conducting filler composition may also be added to the composition in masterbatch form.

Solution blending may also use additional energy such as shear, compression, ultrasonic vibration, or the like to promote homogenization of the conducting filler with the polymeric matrix. In one embodiment, the polymeric matrix may be suspended in a fluid and then introduced into an ultrasonic sonicator along with the conducting filler to form a mixture. The mixture may be solution blended by sonication for a time period effective to disperse the conducting filler particles within the polymeric matrix. The mixture may then be dried, extruded and molded if desired. In one embodiment, the fluid may swell the polymeric matrix during the process of sonication. Swelling the organic polymer may improve the ability of the conductive filler to impregnate the polymeric matrix during the solution blending process and consequently improve dispersion.

In one embodiment during solution blending, the conducting filler along with optional additives may be sonicated together with polymer precursors. Polymer precursors may include one or more of monomers, dimers, trimers, or the like, which may be reacted to form the desired polymeric matrix. A fluid such as a solvent may be introduced into the sonicator with the conducting filler and the polymer precursor. The time period for the sonication may be an amount effective to promote encapsulation of the conducting filler composition by the polymer precursor. After the encapsulation, the polymer precursor may then be polymerized to form an polymer matrix having dispersed conductive fillers.

Solvents may be used in the solution blending of the composition. A solvent may be used as a viscosity modifier, or to facilitate the dispersion and/or suspension of electrically conducting filler composition. Liquid aprotic polar solvents such as one or more of propylene carbonate, ethylene carbonate, butyrolactone, acetonitrile, benzonitrile, nitromethane, nitrobenzene, sulfolane, dimethylformamide, N-methylpyrrolidone, or the like, may be used. Polar protic solvents such as one or more of water, methanol, acetonitrile, nitromethane, ethanol, propanol, isopropanol, butanol, or the like, may be used. Other non-polar solvents such as one or more of benzene, toluene, methylene chloride, carbon tetrachloride, hexane, diethyl ether, tetrahydrofuran, or the like, may also be used. Co-solvents comprising at least one aprotic polar solvent and at least one non-polar solvent may also be used. The solvent may be evaporated before, during and/or after the blending of the composition.

A composition having the polymeric matrix and a conductive filler dispersed in the polymeric matrix may be subject to multiple blending and forming steps if desirable. For example, the composition may first be extruded and formed into pellets. The pellets may then be fed into a molding machine where it may be formed into other desirable shapes. Alternatively, the composition emanating from a melt blender may be formed into sheets or strands and subjected to post-extrusion processes such as annealing, uniaxial or biaxial orientation, or deep-drawing. In one embodiment, the composition may be extruded or injection molded to form an article.

A composition prepared according to the embodiments of the invention may be formed into an article and used in one or more electrical devices. In one embodiment, a circuit-opening device may include an article in accordance with one embodiment of the invention. A circuit-opening device may refer to a device that is operable to open a circuit in response to one or more of current, voltage, heat, or time for which the current or heat is applied. An open circuit may refer to a circuit, which may have an infinitely large resistance or impedance to flow of current across the circuit.

An article in accordance with one embodiment of the invention may be in electrical communication with a current source. A current may flow across the circuit and across the article. Application of current across the article may result in heating of the article and the heat generated may be determined by the equation $I^2R$, where I is the current flowing across the composition and R is the electrical resistance of the article. The amount of heat generated may also be dissipated in a certain amount. One or more of the amount of heat generated, the rate of heat generation, the amount of heat dissipation, or rate of heat dissipation may depend on one or more of thermal characteristics of the composition (for example, specific heat capacity, dissipation constant, and the like), the geometry of the article (surface area of the article, volume of composition in the article), the time for which the current flows across the circuit, or ambient conditions (ambient temperature, air flow, and the like). In one embodiment, the configuration of the composition in the article may be such that when the current exceeds a certain current limit, the rate of heat generation in the composition may be greater than the rate of heat dissipation. The excess heat generation may result in heating of the composition and an increase in the temperature of the composition. If the heat generated is sufficient to heat the composition to a temperature equal to the trip temperature, the electrical resistance of the composition may increase sharply. The increase in resistance may decrease the current flow across the circuit and open the circuit.

The current limit at which the composition may trip may be determined by the current limit of an electrical device or system with which the article is in electrical communication with. In one embodiment, the current limit may be in a range from about 1 milliAmperes to about 10 milliAmperes, from about 10 milliAmperes to about 50 milliAmperes, from about 50 milliAmperes to about 250 milliAmperes, from about 250 milliAmperes to about 500 milliAmperes, or from about 500 milliAmperes to about 1 Ampere. In one embodiment, the current limit may be in a range from about 1 Ampere to about 2 Amperes, from about 2 Amperes to about 4 Amperes, from about 4 Amperes to about 6 Amperes, from about 6 Amperes to about 8 Amperes, or from about 8 Amperes to about 10 Amperes. In one embodiment, the current limit may be in a range from about 10 Amperes to about 20 Amperes, from about 20 Amperes to about 50 Amperes, from about 50 Amperes to about 75 Amperes, from about 75 Amperes to about 150 Amperes, or from about 150 Amperes to about 200 Amperes. In one embodiment, the current limit may be in a range greater than about 200 Amperes.

The operable voltage for the article may also be determined by the voltage limit of an electrical device or system to which the article may be in electrical communication with. In one embodiment, the article may be configured to be operable at a voltage in a range of greater than about 12 Volts. In one embodiment, the article may be configured to be operable at a voltage in a range of greater than about 120 Volts.

A circuit-opening device may be an over-current protection device, an electrical fuse, or may open operate to open a circuit if a short circuit occurs. A short circuit is an undesirably low-resistance connection between two nodes of an electrical circuit that are at different voltages.

In one embodiment, the configuration of the composition in the article may be such that a current may flows across the circuit for a time period resulting in heating of the composition. After a cutoff time period, the amount of heat generated may be greater than the amount of heat dissipated and the composition may heat to a temperature above the trip temperature. This may result in an increase in the electrical resistance, a reduction in the current flow across the circuit, and opening of the circuit.

The cutoff time period may depend on one or more of amount of current supplied to the circuit, heat capacity of the composition, dissipation constant of the composition, or thermal time constant of the composition. Heat capacity may be defined as a product of the specific heat and mass of the composition. Heat capacity is an amount of heat required to produce a change in the body temperature of the composition by 1 degree Celsius. Dissipation Constant is a ratio of the change in the power applied to the composition to the resulting change in body temperature due to self-heating. Dissipation constant may depend on one more of ambient temperature, conduction or convection paths between the device and its surroundings, or the shape of the device. Thermal time constant is an amount of time required for the composition to change 63.2 percent of the difference between the self-heated temperature and the ambient temperature after power is disconnected. The thermal time constant may also depend on one more of ambient temperature, conduction or convection paths between the device and its surroundings, or the shape of the device.

In one embodiment, a switch may include a circuit-opening device in accordance with one embodiment of the invention. The switch may electrically communicate with a degaussing coil. In one embodiment, the degaussing coil may electrically communicate with a cathode ray tube, and reduce a magnetic field produced inside the cathode ray tube. In one embodiment, a video display unit may include the cathode ray tube, and the degaussing coil electrically communicating with the switch. A video display unit may include one or more of a television screen, a computer monitor, or a laptop screen.

In one embodiment, the switch may electrically communicate with a relay coil. The relay coil may act like a switch for opening or closing one or more circuits. A relay may be an electromechanical device actuated by an electrical current. The current flowing in one circuit may open or close another circuit. A relay may be use in one or more of telephone exchanges, digital computers, automation systems, or electric power systems. In electrical power systems, relays may be utilized to protect electric power systems against power blackouts as well as to regulate and control the generation and distribution of power. Relays may also be used in household applications, such as one or more of refrigerators, washing machines, dishwashers, heating controls, or air-conditioning controls.

In one embodiment, an electrical assist device may include a circuit opening device in accordance with one embodiment of the invention. The electrical assist device may be in electrical communication with an electrical motor winding, and the electrical assist device may assist in operation of an electrical motor. In one embodiment, more current may be applied via the electrical assist device to the electrical motor at a first temperature than at a second temperature. The first temperature may be a temperature in a range of about lower than a trip temperature of the composition. The second temperature may in a range of about equal to or greater than a trip temperature of the composition. In one embodiment, the electrical assist device may help in starting an electrical motor by initially allowing a relatively large amount of current to flow to the electrical motor; and after a certain time (once the electrical motor has started), the electrical assist device may allow no or relatively low current to flow to the electrical motor. In one embodiment, the electrical assist device may assist in operation of an electrical motor of a motorized vehicle.

In one embodiment, a heating device may include an article in accordance with one embodiment of the invention. The configuration of the composition in the article may be such that the article may responds to an influx of current by generating an amount of heat resulting in heating the article to an operating temperature. The operating temperature may be adjusted or determined by changing the amount of current flowing across the circuit. An operating current may provide an operating temperature.

The amount of heat generated and the resultant temperature may depend on one or more of an amount of current applied, thermal characteristics of the composition, volume of the composition, surface area of the article, or ambient conditions. The operating current be determined by one or more of ambient conditions, heat capacity of the composition, dissipation constant of the composition, or thermal time constant of the composition, wherein heat capacity, dissipation constant and thermal constant are the same as defined herein above.

In one embodiment, a self-regulating heating device may include an article in accordance with one embodiment of the invention. In a self-regulating heater, the composition may be configured such that when the article temperature exceeds or lags behind the operating temperature, the electrical resistance of the composition may increase or decrease accordingly resulting in a reduction or increase in the current flow across the circuit. The reduction or increase in the current flow across the circuit may correspond to an increase or decrease in heat generation by the article respectively. A change in heat generation may result in change in temperature of the article and result in maintaining the article at a constant operating temperature.

A heating device (self-regulating or non self-regulating) may be used in one or more of automotive heating applications, medical heating applications, industrial heating applications, or household heating applications. Household heating applications may include one or more of air dryers, air conditioners, water heaters, mat/cushion heaters, hot plates, or child device heaters, such as crib warmers, towelette warmers, car seat warmers, bottle warmers, or bassinette warmers. Automotive heating applications may include heating one or more of a seat, an oil sump, a steering wheels a door panel, a fan, a window, or a mirror. Medical heating applications may include one or more of electrosurgical instruments, humidifiers, heated blankets, or control panels.

EXAMPLES

The following examples are intended only to illustrate methods and embodiments in accordance with the invention, and as such should not be construed as imposing limitations upon the claims. Barium titanate ($BaTiO_3$) may be obtained from Ferro Electronic Materials, USA and is used as a ceramic filler. Lanthanum oxide ($La_2O_3$) (obtainable from SISCO Research Laboratories Pvt. Ltd., India), niobium oxide ($Nb_2O_5$) (obtainable from Sigma-Aldrich Inc., USA), antimony oxide ($Sb_2O_3$) (obtainable from Sigma-Aldrich Inc., USA) and manganese dioxide ($MnO_2$) (obtainable from Qualigens Fine Chemicals, India) are the indicated dopants. Pre-doped $BaTiO_3$ are obtainable from Shenzen AMPRON Sensitive Components, Co. Ltd., China (for example, Batch Numbers: P8D-03, X0D-04 and X2D-05). Pre-doped and sintered $BaTiO_3$ powder are obtainable from Nantong Morning Sun, China. Polyvinyl alcohol (PVA, 2 wt % solution in water) is obtainable from Sigma-Aldrich Inc., USA. Contaminant or inclusion types and/or levels may differ in batch to batch and from supplier to supplier. For this reason the supplier, and the batch number where possible, are indicated but should not be construed as restrictive of the inventive scope unless context or language so indicates.

Example 1

Doping of $BaTiO_3$ with three different donor dopants (La, Sb and Nb—) is carried out with different dopant concentrations, with and without manganese (Mn) as acceptor. $BaTiO_3$ is also doped with Sb and Nb simultaneously. The doping formulations for La-doped $BaTiO_3$ and Sb, Nb-doped $BaTiO_3$ are shown in Table 1 and Table 2, respectively.

Figure 3:
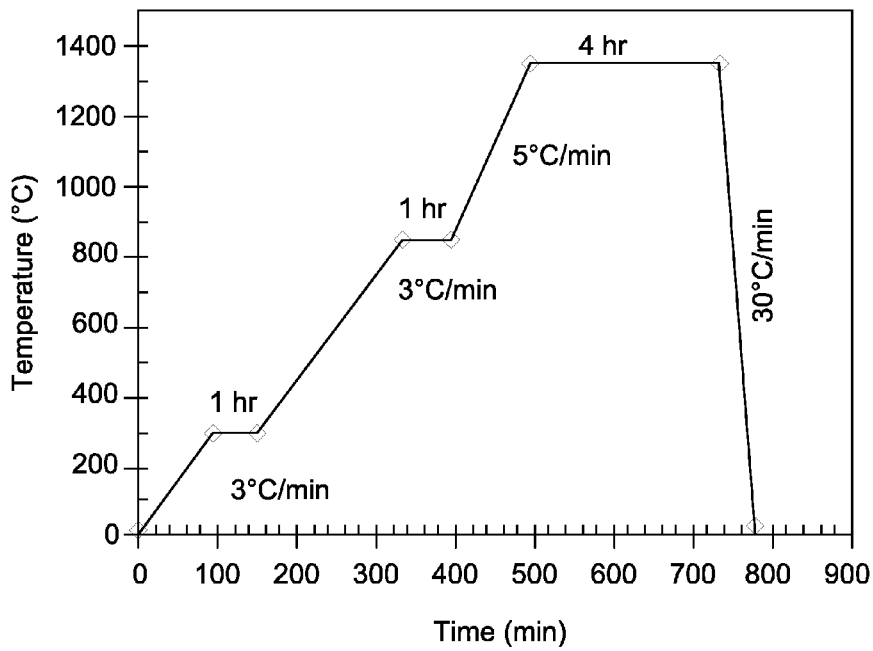
FIG. 3 is a sintering profile for doped barium titanate fillers.

Doping of $BaTiO_3$ is performed by a simple mixing method or a bar milling method. In the simple mixing method, measured amounts of dopants and $BaTiO_3$ powder is mixed in a pestle and mortar with acetone as a solvent. The resulting mixed powder is air dried and then sintered in air at high temperature. In the bar milling method, 20 grams of $BaTiO_3$ powder, along with the doping agents, is mixed with isopropyl alcohol (60 milliliters). The resulting mixture is ball milled for 8 hrs in a three roller ball-milling machine, using yttria stabilized zirconia milling media (YSZ, 80 grams). The ball-milled mixture is air-dried and then sintered in air. Sintering of doped $BaTiO_3$ powder and pellets is carried out in a furnace. Pellets of doped $BaTiO_3$ are prepared with 2 weight percent PVA solution, in a die under pressure. PVA is used as the binder for making doped $BaTiO_3$ pellets during sintering process. Both the powders and pellets are sintered for 6 hours, using the sintering schedule shown in FIG. 3. Doped and Sintered $BaTiO_3$ (Samples 1-9) are then dispersed in a polymeric matrix.

TABLE 1

| Sample No. | Formulations | At. % of La | $La_2O_3$ (mg) | $MnO_2$ (mg) | $BaTiO_3$ (mg) |
|---|---|---|---|---|---|
| 1 | $Ba_{0.998}La_{0.002}TiO_3$ | 0.2 | 27.60 | 0 | 19.96 |
| 2 | $Ba_{0.997}La_{0.003}TiO_3$ | 0.3 | 41.75 | 0 | 19.96 |
| 3 | $Ba_{0.996}La_{0.004}TiO_3$ | 0.4 | 56.00 | 0 | 19.93 |
| 4 | $Ba_{0.9967}La_{0.003}Mn_{0.0003}TiO_3$ | 0.3 | 41.92 | 2.24 | 19.99 |

TABLE 2

| Sample No. | Formulations | $BaTiO_3$ (g) | $Sb_2O_3$ (mg) | $Nb_2O_5$ (mg) | $MnO_2$ (mg) |
|---|---|---|---|---|---|
| 5 | $Ba_{0.997}Sb_{0.003}TiO_3$ | 20.01 | 37.47 | 0 | 0 |
| 6 | $BaNb_{0.003}Ti_{0.997}O_3$ | 20.02 | 0 | 34.18 | 0 |
| 7 | $Ba_{0.9967}Sb_{0.003}Mn_{0.0003}TiO_3$ | 20.01 | 37.46 | 0 | 2.23 |
| 8 | $BaNb_{0.003}Mn_{0.0003}Ti_{0.9967}O_3$ | 20.02 | 0 | 34.18 | 2.23 |
| 9 | $Ba_{0.997}Sb_{0.003}Nb_{0.003}Ti_{0.997}O_3$ | 19.96 | 37.46 | 34.09 | 0 |

Example 2

Samples 1, 2 and 3 are dispersed in a nylon-6 matrix to form composites with doped $BaTiO_3$. Prior to melt mixing, nylon-6 powder is air dried in an oven at 150 degrees Celsius for 12 hours to eliminate any moisture-induced degradation. The composites are prepared in a laboratory-mixing machine (LMM) by melt mixing. Mixing is carried out at about 260 degrees Celsius at 80 percent rotor speed, for a duration of about 10 minutes. The melt-mixed mixture is injection molded to form Nylon-6 composites with La-doped $BaTiO_3$ (Samples 10-12). The compounding formulations for three different atomic compositions (Sample Nos. 10-12) of La-doped $BaTiO_3$ in Nylon-6 composites are shown in Table 3. The weight percentage of La-doped $BaTiO_3$ in the polymeric matrix is in an amount in a range of from about 80 weight percent to about 90 weight percent.

TABLE 3

| Sample No. | At. % of La | La—BaTiO$_3$ (wt %) | La—BaTiO$_3$ (g) | Nylon-6 (g) | Nylon-6 (wt %) | Total (g) |
|---|---|---|---|---|---|---|
| 10 | 0.2 | 85 | 3.4 | 0.6 | 15 | 4 |
| 11 | 0.3 | 85 | 3.4 | 0.6 | 15 | 4 |
| 12 | 0.4 | 85 | 3.4 | 0.6 | 15 | 4 |

Example 3

A second conducting filler, carbon black, is dispersed in the Nylon-6 polymeric matrix along with 0.3 at % La-doped BaTiO$_3$. Two different concentrations of carbon black are used: 0.1 weight percent (with respect to total filler loading) and 0.2 weight percent (with respect to total filler loading). Assuming random distribution of carbon black and La-doped BaTiO$_3$ in Nylon-6, at 0.2 wt % of carbon black (with respect to total filler loading) the effective loading of carbon black in nylon-6 reaches to 2.8 weight percent, which is closer to CB percolation level (3 weight percent) in nylon-6. The composites are prepared in a laboratory-mixing machine (LMM) by melt mixing. Prior to melt mixing, nylon-6 powder is air dried in an oven at 150 degrees Celsius for 12 hours to eliminate any moisture-induced degradation. Mixing is carried out at about 260 degrees Celsius at 80 percent rotor speed, for a duration of about 10 minutes. The melt-mixed mixture is injection molded to form Nylon-6 composites with La-doped BaTiO3 (Samples 13 and 14). The compounding formulations for two different La-doped BaTiO$_3$ and carbon black concentrations in Nylon-6 composites are shown in Table 4.

TABLE 4

| Sample No. | At. % of La | La—BaTiO$_3$ (wt %) | carbon black (wt %) | Nylon-6 (wt %) | Total (g) |
|---|---|---|---|---|---|
| 13 | 0.3 | 84.9 | 0.1 | 15 | 4 |
| 14 | 0.3 | 84.8 | 0.2 | 15 | 4 |

Example 4

Pre-doped commercially available BaTiO$_3$ is dispersed in nylon-6 and polybutylene terephthalate (PBT) matrices. The Curie temperature (T$_c$), sintering temperature, sintering conditions, and resistivity values of the commercially available pre-doped BaTiO$_3$ are provided in Table 5. Sintered BaTiO$_3$ is prepared using the processing conditions detailed in Table 4 to prepare Samples 15-17.

TABLE 5

| Sample No. | Tc (C.) | Sintering Temp (C.) | Sintering Time (min) | Cooling rate (C./h) | shrinkage (%) | resistivity (ohm · cm) |
|---|---|---|---|---|---|---|
| 15 | 99-105 | 1350 | 60-90 | 150~220 | 15 | ~10 |
| 16 | 115-125 | 1350 | 60-90 | 150~250 | 15 | ~10 |
| 17 | 75-85 | 1340 | 60-90 | 180~250 | 15~16 | ~10 |

Samples 15, 16 and 17 are dispersed in a nylon-6 matrix at a concentration of 80 weight percent to form composites with doped BaTiO$_3$. Samples 15, 16 and 17 are also dispersed in a polybutylene terephthalate (PBT) matrix at a concentration of 85 weight percent to form composites with doped BaTiO$_3$. The composites are prepared in a laboratory-mixing machine (LMM) by melt mixing. Prior to melt mixing, nylon-6 powder is air dried in an oven at 150 degrees Celsius for 12 hours to eliminate any moisture-induced degradation. Mixing is carried out at about 260 degrees Celsius at 80 percent rotor speed, for a duration of about 10 minutes. The melt-mixed mixture is injection molded to form Nylon-6 composites with doped BaTiO$_3$ (Samples 18-20) and PBT composites with doped BaTiO$_3$ (Samples 21-23). Details of sample preparation for Samples 18-23 are provided in Table 6.

TABLE 6

| Sample No. | BaTiO$_3$ wt % | Polymer | Polymer wt % | Wt of BaTiO$_3$ (g) | Wt of polymer (g) | Total wt (g) |
|---|---|---|---|---|---|---|
| 18 | 85 | PA6 | 15 | 3.4 | 0.6 | 4 |
| 19 | 85 | PA6 | 15 | 3.4 | 0.6 | 4 |
| 20 | 85 | PA6 | 15 | 3.4 | 0.6 | 4 |
| 21 | 85 | PBT | 15 | 3.4 | 0.6 | 4 |
| 22 | 85 | PBT | 15 | 3.4 | 0.6 | 4 |
| 23 | 85 | PBT | 15 | 3.4 | 0.6 | 4 |

Example 5

Pre-doped and sintered BaTiO$_3$ (Sample 24, commercially available from Nantong Morning Sun, China) is dispersed in a nylon-6 matrix to form a composite material (Sample 25). Sample 24 has a Curie temperature of 102.1 degrees Celsius and a room temperature resistance of 0.86 Ohms as provided by the supplier. The composite (Sample 25) is prepared using the experimental conditions detailed in EXAMPLE 4 using 85 weight percent of filler in 4 grams of the total composition weight.

The sintered BaTiO$_3$ pellets and polymer composites with dispersed BaTiO$_3$ (Samples 1-21) are tested for their positive temperature coefficient of resistance (PTC) properties. The PTC properties of the sintered pellets and composites are measured using a multimeter. The two ends of the injection-molded bars were fractured cryogenically and silver paints were applied as electrode onto the fracture surface of the samples. One of the sample in the form of a molded bar (2×0.5×0.3 centimeters) is placed on a heating plate connected to a heating controller and thermistor. Silver paint is applied to the fractured surfaces and dried at room temperature for 8 hours. The sample is then placed on a heating plate connected with the heating controller. The resistance and the temperature of the sample are measured simultaneously from room temperature to trip temperature, while measuring the resistance values at every 5 degrees Celsius increase in temperature.

Figure 4:
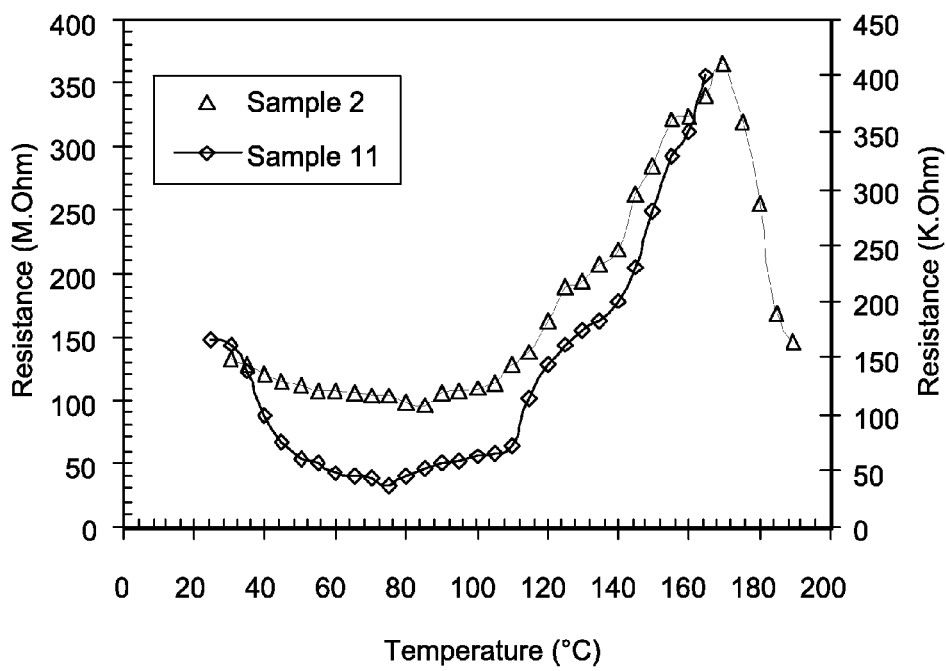
FIG. 4 is a plot of electrical resistance as function of temperature.

FIG. 4 shows a plot of electrical resistance as function of increase in temperature for Sample 2 and Sample 11. The values of the room temperature resistance (Res$_{RT}$), trip temperature (T$_{trip}$), maximum resistance (Res$_{Max}$), and temperature of max resistance (T$_{Max\,Res}$) are measured and tabulated in Table 7. Room temperature resistance (133 K·ohm) of the filler (Sample 2) in the composite (Sample 11) is shifted to (165 M·ohm) a higher value, while the PTC trip temperature of the filler (105° C.) does not change in the composite (110° C.).

TABLE 7

| Sample | $Res_{RT}$ | $T_{trip}$ (° C.) | $Res_{Max}$ | $M_{ax\ Res}$ (° C.) |
|---|---|---|---|---|
| 2 | 133 K.Ohm | ~110 | 365 K.Ohm | 170 |
| 11 | 165 M.Ohm | ~115 | 400 M.Ohm | 165 |

Figure 5:
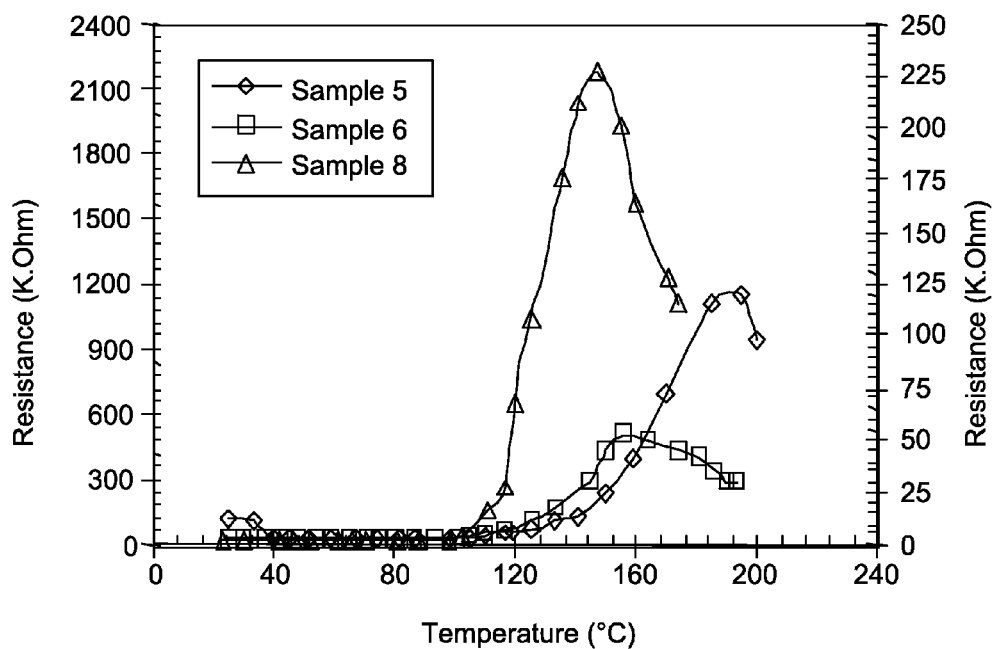
FIG. 5 is a plot of electrical resistance as function of temperature.

FIG. 5 shows a plot of electrical resistance as a function of increase in temperature for Samples 5, 6 and 8. The values of the room temperature resistance ($Res_{RT}$), trip temperature ($T_{trip}$), maximum resistance ($Res_{Max}$), temperature of max resistance ($T_{Max\ Res}$), and PTC intensity are measured and tabulated in Table 8. PTCR behavior of Sb and Nb-doped BaTiO$_3$ pellets (Samples 5 and 6) shows that doping BaTiO$_3$ with Sb and Nb results in a decrease in room temperature resistance of the sintered pellets, compared to the La-doped BaTiO$_3$ (Sample 2). For instance, room temperature resistance (133 K·ohm) of 0.3 at % La-doped BaTiO$_3$ decreases when BaTiO$_3$ is doped with 0.3 at % Nb (2.72 K·ohm) and 0.3 at % Sb (12 K·ohm). The PTC trip temperatures (~105° C.) of Samples 5 and 6 show good agreement with Sample 2 (~110° C.), while PTC intensities of Samples 5 and 6 increase compared to Sample 2.

Addition of manganese during doping increases the PTC intensity of doped BaTiO$_3$. For instance, PTC intensity (115) of Nb-doped BaTiO$_3$ along with 0.03 at % Mn (Sample 8) increases compared to the PTC intensity (20) of Nb-doped BaTiO$_3$ (Sample 6).

TABLE 8

| Sample | $Res_{RT}$ (K·Ohm) | $T_{trip}$ (° C.) | $Res_{max}$ (K·Ohm) | $T_{max\ res}$ (° C.) | PTC intensity |
|---|---|---|---|---|---|
| 5 | 12 | 105 | 119 | 195 | 10 |
| 6 | 2.72 | 105 | 53 | 155 | 20 |
| 8 | 19 | 100 | 2175 | 147 | 115 |

Figure 6:
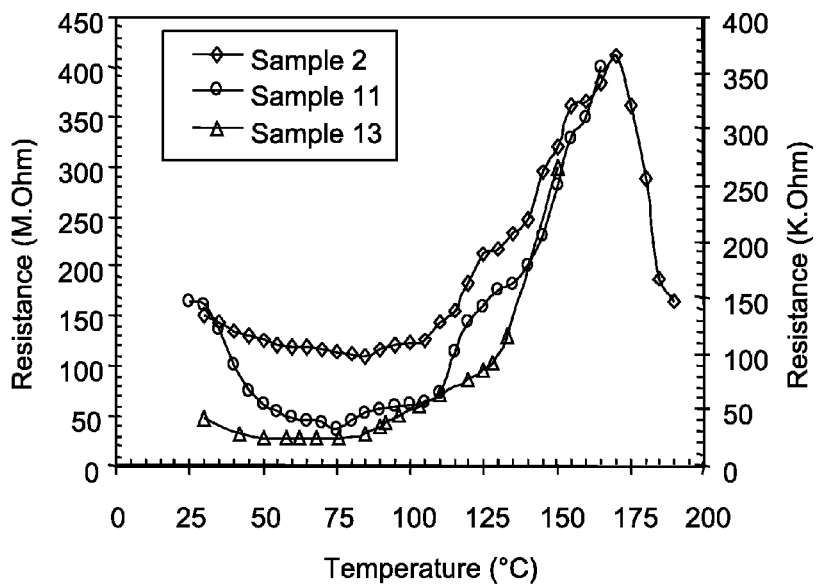
FIG. 6 is a plot of electrical resistance as function of temperature.

FIG. 6 shows a plot of electrical resistance as function of increase in temperature for Samples 2, 11, 13 and 14. The values of the room temperature resistance ($Res_{RT}$), trip temperature ($T_{trip}$), maximum resistance ($Res_{Max}$), temperature of max resistance ($T_{Max\ Res}$), and PTC intensity are tabulated in Table 9. PTC trip temperature of La—BaTiO$_3$ (sample 2) doesn't change in La—BaTiO$_3$ Nylon (Sample 11) and La—BaTiO3 carbon black nylon (Sample 13) composites with lower loading (less than 0.2 wt % with respect to total filler loading) of carbon black. At higher loading levels the percolation limit of carbon black is reached and no PTC effect is observed (Sample 14). Addition of carbon black below the percolation loading also increases PTC intensity by lowering the room temperature resistance.

TABLE 9

| Sample No. | $Res_{RT}$ | $T_{trip}$ (° C.) | PTC intensity |
|---|---|---|---|
| 2 | 133 KOhm | 110-115 | 2.7 |
| 11 | 165 MOhm | 115-120 | 2.7 |
| 13 | 48 MOhm | 110-115 | 8 |
| 14 | 20 MOhm | no PTC | no PTC |

Figure 7:
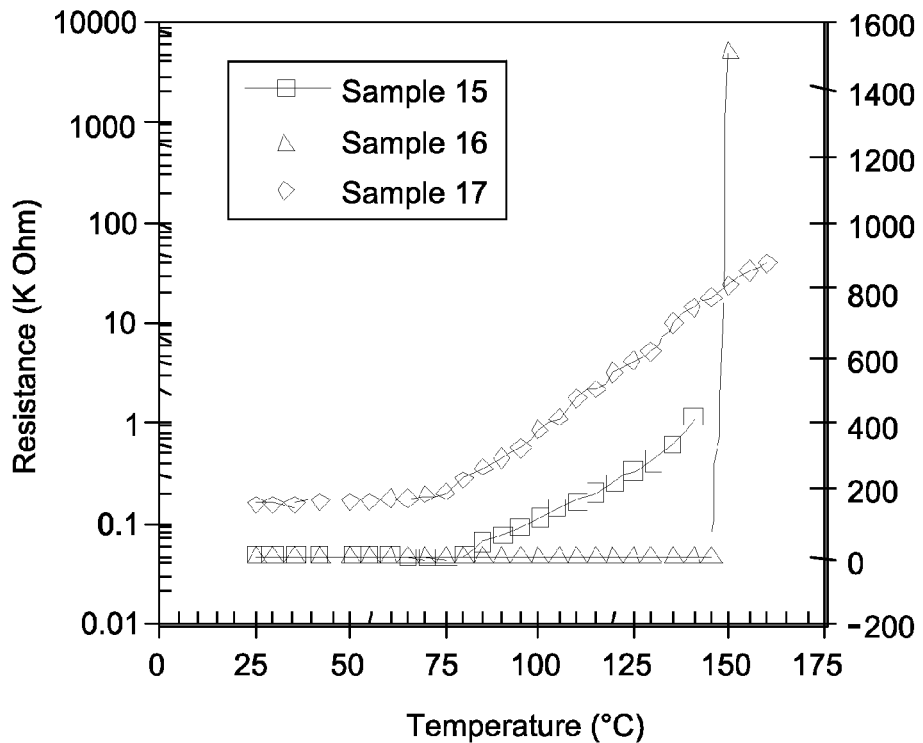
FIG. 7 is a plot of electrical resistance as function of temperature.
Figure 8:
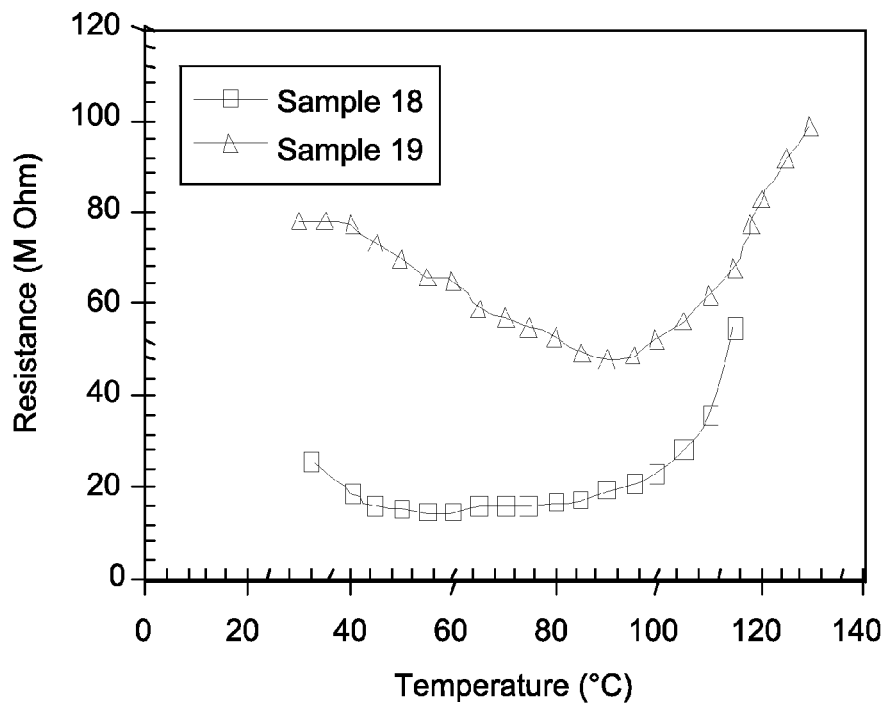
FIG. 8 is a plot of electrical resistance as function of temperature.
Figure 9:
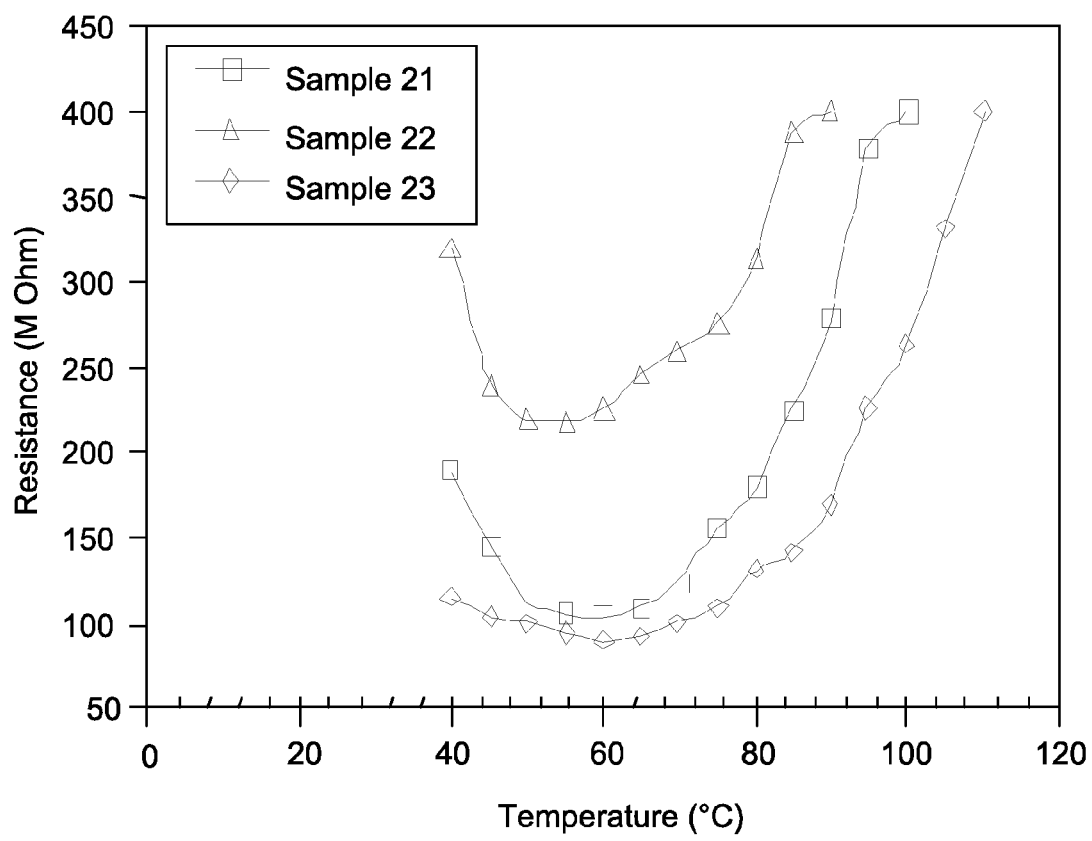
FIG. 9 is a plot of electrical resistance as function of temperature.

FIG. 8 shows a plot of electrical resistance as function of increase in temperature for commercially available pre-doped-BaTiO$_3$ fillers (Samples 15-17). FIG. 8 shows a plot of electrical resistance as function of increase in temperature for Nylon-6 composites with pre-doped BaTiO$_3$ (Samples 18 and 19). FIG. 9 shows a plot of electrical resistance as function of increase in temperature for PBT composites with pre-doped BaTiO$_3$ (Samples 21-23). The trip temperature of the composites with Nylon-6 (FIG. 7) and PBT (FIG. 8) is almost the same as that of neat fillers (FIG. 6).

The values of the room temperature resistance ($Res_{RT}$), trip temperature ($T_{trip}$), maximum resistance ($Res_{Max}$), temperature of max resistance ($T_{Max\ Res}$), and PTC intensity for Sample 25 are tabulated in Table 10. PTC trip temperature of BaTiO$_3$ in Nylon-6 is the same as that of neat filler while the $Res_{RT}$ for the composite increases considerably.

TABLE 10

| Sample | $Res_{RT}$ | $T_{trip}$ (° C.) | $Res_{max}$ (K.Ohm) | $T_{max\ res}$ (° C.) |
|---|---|---|---|---|
| 26 | 35 MOhms | ~102 | 92 MOhms | 120 |

Example 6

Doped and sintered BaTiO$_3$ (samples 1-9, 15-27, and 24, pre-doped or doped according to the procedure described in Example 1) are dispersed in an organic, thermoplastic, amorphous, polycarbonate matrix, according to the procedure described in Example 4. Doped and sintered BaTiO$_3$ includes La, Sb, and Nb as dopants and in some samples Mn is used as an acceptor. Combinations of dopants, such as Sb and Nb are used in some examples. In one embodiment, the amount of filler in the polymeric matrix is varied in a range of from about 10 weight percent to about 50 weight percent. In one embodiment, the amount of filler in the polymeric matrix is varied in a range of from about 50 weight percent to about 90 weight percent. The polycarbonate matrix with doped BaTiO$_3$ filler shows PTCR properties and has a trip temperature related to the Curie temperature of doped BaTiO$_3$.

Example 7

Doped and sintered BaTiO$_3$ (samples 1-9, 15-27, and 24, pre-doped or doped according to the procedure described in Example 1) are dispersed in an organic, thermoplastic, crystalline high-density polyethylene (HDPE) matrix, according to the procedure described in Example 4. Doped and sintered BaTiO$_3$ includes La, Sb, and Nb as dopants and in some samples Mn is used as an acceptor. Combinations of dopants, such as Sb and Nb are used in some examples. In one embodiment, the amount of filler in the polymeric matrix is varied in a range of from about 10 weight percent to about 50 weight percent. In one embodiment, the amount of filler in the polymeric matrix is varied in a range of from about 50 weight percent to about 90 weight percent. The HDPE matrix with doped BaTiO$_3$ filler shows PTCR properties and has a trip temperature related to the Curie temperature of doped BaTiO$_3$.

Example 8

Doped and sintered BaTiO$_3$ (samples 1-9, 15-27, and 24, pre-doped or doped according to the procedure described in Example 1) are dispersed in an organic, thermoset, amorphous polyurethane matrix, according to the procedure described in Example 4. The cure temperature of the polyurethane matrix is greater than the Curie temperature of doped BaTiO$_3$. Doped and sintered BaTiO$_3$ includes La, Sb, and Nb as dopants and in some samples Mn is used as an acceptor. Combinations of dopants, such as Sb and Nb are used in some examples. In one embodiment, the amount of filler in the polymeric matrix is varied in a range of from about 10 weight percent to about 50 weight percent. In one embodiment, the amount of filler in the polymeric matrix is varied in a range of from about 50 weight percent to about 90 weight percent. The polyurethane matrix with doped $BaTiO_3$ filler shows PTCR properties and has a trip temperature related to the Curie temperature of doped $BaTiO_3$.

Example 10

Doped and sintered $BaTiO_3$ (samples 1-9, 15-27, and 24, pre-doped or doped according to the procedure described in Example 1) are dispersed in an inorganic, thermoset, amorphous epoxy-functionalized polysiloxane matrix, according to the procedure described in Example 4. The cure temperature of the epoxy-functionalized polysiloxane matrix is greater than the Curie temperature of doped $BaTiO_3$. Doped and sintered $BaTiO_3$ includes La, Sb, and Nb as dopants and in some samples Mn is used as an acceptor. Combinations of dopants, such as Sb and Nb are used in some examples. In one embodiment, the amount of filler in the polymeric matrix is varied in a range of from about 10 weight percent to about 50 weight percent. In one embodiment, the amount of filler in the polymeric matrix is varied in a range of from about 50 weight percent to about 90 weight percent. The epoxy-functionalized polysiloxane matrix with doped $BaTiO_3$ filler shows PTCR properties and has a trip temperature related to the Curie temperature of doped $BaTiO_3$.

Example 11

Doped and sintered $BaTiO_3$ (samples 1-9, 15-27, and 24, pre-doped or doped according to the procedure described in Example 1) are dispersed in an inorganic, thermoplastic, amorphous polysiloxane matrix, according to the procedure described in Example 4. The cure temperature of the polyurethane matrix is greater than the Curie temperature of doped $BaTiO_3$. Doped and sintered $BaTiO_3$ includes La, Sb, and Nb as dopants and in some samples Mn is used as an acceptor. Combinations of dopants, such as Sb and Nb are used in some examples. In one embodiment, the amount of filler in the polymeric matrix is varied in a range of from about 10 weight percent to about 50 weight percent. In one embodiment, the amount of filler in the polymeric matrix is varied in a range of from about 50 weight percent to about 90 weight percent. The polysiloxane matrix with doped $BaTiO_3$ filler shows PTCR properties and has a trip temperature related to the Curie temperature of doped $BaTiO_3$.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

The invention claimed is:

1. A composition comprising:
   a polymeric matrix; and
   a filler dispersed in the polymeric matrix, and the filler is electrically conducting in a temperature range and the filler has a Curie temperature,
   a second electrically conducting filler comprising one or more of carbon black, carbon nanotubes, graphite, a metal a metal-coated filler, or combinations of two or more thereof; the second filler being present in an amount that is less than a percolation limit; where the second electrically conducting filler is present in an amount of about 1 to 3 wt %; based on the total weight of the composition; and
   the composition has a trip temperature at which electrical resistance of the composition increases with increase in temperature, and the trip temperature of the composition is determined by the Curie temperature of the filler.

2. The composition as defined in claim 1, wherein the filler comprises a ceramic material comprising a metal oxide, a mixed metal oxide, or both a metal oxide and a mixed metal oxide.

3. The composition as defined in claim 1, wherein the filler comprises one or more of alkali earth metals, transition metals, or post transition metals.

4. The composition as defined in claim 3, wherein the filler comprises one or more of barium, calcium, magnesium, lead, strontium, titanium, tin, zirconium, or hafnium.

5. The composition as defined in claim 4, wherein the filler comprises one or more of barium titanate, lead titanate, strontium titanate, barium strontium titanate, barium lead titanate, barium tin titanate, strontium lead titanate, strontium tin titanate, or lead tin titanate.

6. The composition as defined in claim 1, wherein the filler comprises a dopant comprising cations of one or more of rare earth metals, alkaline earth metals, transition metals, or post-transition metals.

7. The composition as defined in claim 6, wherein the dopant comprises cations of one or more of lanthanum, niobium, antimony, scandium, yttrium, neodynium, or samarium.

8. The composition as defined in claim 1, wherein the filler has a Curie temperature in a range from about 20 degrees Celsius to about 120 degrees Celsius.

9. The composition as defined in claim 1, wherein the filler has a Curie temperature in a range from about 120 degrees Celsius to about 400 degrees Celsius.

10. The composition as defined in claim 1, wherein the filler comprises a plurality of particles having an average particle size in a range from about 1 nanometer to about 100 nanometers.

11. The composition as defined in claim 1, wherein the filler has a plurality of particles having an average particle size in a range from about 0.1 micrometers to about 50 micrometers.

12. The composition as defined in claim 1, wherein the filler comprises a plurality of particles having a shape of a sphere, a rods, a tube, a flake, a fiber, a plates, or a whisker, or the plurality includes a combination of two or more of the foregoing shapes.

13. The composition as defined in claim 12, wherein a cross-sectional geometry of the particle is circular, ellipsoidal, triangular, rectangular, or polygonal.

14. The composition as defined in claim 1, wherein the filler is present in an amount in a range of from about 50 weight percent to about 99 weight percent of the composition.

15. The composition as defined in claim 1, wherein the filler is present in an amount in a range of from about 10 weight percent to about 50 weight percent of the composition.

16. The composition as defined in claim 6, wherein the dopant is present in an amount in a range of less than about 5 atomic percent of the filler.

17. The composition as defined in claim 16, wherein the dopant is present in an amount in a range of from about 0.1 atomic percent to about 1 atomic percent of the filler.

18. The composition as defined in claim 1, wherein the polymeric matrix comprises one or more of a crystalline polymer, a thermoplastic polymer, or an organic polymer.

19. The composition as defined in claim 1, wherein the polymeric matrix comprises one or more of an amorphous polymer, a thermoset polymer, or an inorganic polymer.

20. The composition as defined in claim 1, wherein the trip temperature of the composition is in a range from about 20 degrees Celsius to about 120 degrees Celsius.

21. The composition as defined in claim 1, wherein the trip temperature of the composition is in a range from about 120 degrees Celsius to about 400 degrees Celsius.

22. The composition as defined in claim 1, wherein the composition has a room temperature electrical resistance in a range of less than about 200 Mega ohm-centimeter.

23. The composition as defined in claim 1, wherein the composition has a room temperature electrical resistance in a range of from about 1 MegaOhm to about 100 MegaOhms.

24. The composition as defined in claim 1, wherein an electrical resistance of the composition at the trip temperature is greater than an electrical resistance of the composition at the room temperature by a factor of at least about 1.5.

25. The composition as defined in claim 1, wherein the composition has a melt viscosity in a range of from about 10 Pascal.seconds to about 1000Pascal. seconds at about 1500 seconds$^{-1}$ shear rate.

26. The composition as defined in claim 1, wherein the composition has a viscosity or a melt profile so as to be processable by one or more of injection molding, blow molding, or extrusion.

27. A method, comprising:
    dispersing an electrically conducting filler having a Curie temperature in a polymeric matrix to form a composition having a trip temperature, and an electrical resistance of the composition increases with an increase in temperature; and
    selecting the filler to be of a type based on the filler Curie temperature, or the amount of the filler, or both the amount and the type of the filler so as to tune the trip temperature of the composition; and
    further containing a second electrically conducting filler comprising one or more of carbon black, carbon nantubes, graphite, a meteal, a metal-coated filler, or combinations of two or more thereof; the second filler being present in an amount that is less than a percolation limit; where the second electrically conducting filler is present in an amount of about 1 to about 3 wt % based on the total weight of the composition; and
    the composition has a trip temperature at which electrical resistance of the composition increases with increase in temperature, and the trip temperature of the composition is determined by the Curie temperature of the filler.

28. The method as defined in claim 27, wherein the composition is flowable under process conditions, and further comprising extruding or injection molding the composition to form an article.

29. A composition comprising:
    a polymeric matrix;
    a filler comprising one or more of, lead titanate, barium strontium titanate, barium lead titanate, barium tin titanate, strontium lead titanate, strontium tin titanate, or lead tin titanate;
    a second filler comprising carbon black, graphite, carbon nanotubes or combinations thereof; the second filler being present in an amount that is less than a percolation threshold; where the second filler is present in amounts of about 1 to about 3 wt %, based on the total weight of the composition.

* * * * *